United States Patent
McCauley et al.

(10) Patent No.: US 11,423,394 B1
(45) Date of Patent: Aug. 23, 2022

(54) ANONYMOUS PAYMENT TRANSACTIONS

(71) Applicant: Block, Inc., San Francisco, CA (US)

(72) Inventors: Nathan P. McCauley, San Francisco, CA (US); Yun Chi, Monte Sereno, CA (US); Rong Yan, Palo Alto, CA (US)

(73) Assignee: Block, Inc., San Francisco, CA (US)

( * ) Notice: Subject to any disclaimer, the term of this patent is extended or adjusted under 35 U.S.C. 154(b) by 0 days.

(21) Appl. No.: 17/216,385

(22) Filed: Mar. 29, 2021

Related U.S. Application Data

(63) Continuation of application No. 14/481,760, filed on Sep. 9, 2014, now Pat. No. 10,963,868.

(51) Int. Cl.
   G06Q 20/36 (2012.01)
   G06Q 20/10 (2012.01)
   (Continued)

(52) U.S. Cl.
   CPC .......... *G06Q 20/367* (2013.01); *G06Q 20/10* (2013.01); *G06Q 20/3223* (2013.01);
   (Continued)

(58) Field of Classification Search
   CPC .. G06Q 20/367; G06Q 20/10; G06Q 20/3274; G06Q 20/3276; G06Q 20/3223; G06Q 20/40
   See application file for complete search history.

(56) References Cited

U.S. PATENT DOCUMENTS 4,838,384 A   6/1989  Thangavelu
5,506,898 A   4/1996  Costantini et al.
(Continued)

FOREIGN PATENT DOCUMENTS

JP   2004102570 A   4/2004
WO   WO-2013147954 A1 * 10/2013  ............. G06Q 30/00
WO   2016/069958 A1   5/2016

OTHER PUBLICATIONS

"A 2D Barcode-Based Mobile Payment System"; Jerry Gao, Vijay Kulkarni, Himanshu Ranavat, Lee Chang, Hsing Mei; 2009 Third International Conference on Multimedia and Ubiquitous Engineering. (Year: 2009).*

(Continued)

*Primary Examiner* — John W Hayes
*Assistant Examiner* — Edgar R Martinez-Hernandez
(74) *Attorney, Agent, or Firm* — Baker Botts L.L.P.

(57) ABSTRACT

In an embodiment, a method performed by a payment service system (PSS) includes receiving from a first payment application associated with the PSS, a request to generate a token. The method includes identifying account information associated with the recipient. The method includes generating an anonymizing token associated with the recipient. The method includes storing an association between the account information of the recipient and the anonymizing token. The method includes providing for display of the anonymizing token within the first payment application. The anonymizing token anonymously embeds recipient information and the account information of the recipient. The method includes, upon receiving an indication of an intent to transfer payment through interaction with the anonymizing token via a second payment application, identifying a recipient account associated with the recipient based on an identification of the stored association and automatically facilitating a transfer of funds to the recipient account.

20 Claims, 8 Drawing Sheets

(51) Int. Cl.
  *G06Q 20/32* (2012.01)
  *G06Q 20/40* (2012.01)
(52) U.S. Cl.
  CPC ..... *G06Q 20/3274* (2013.01); *G06Q 20/3276* (2013.01); *G06Q 20/40* (2013.01)

(56) References Cited

U.S. PATENT DOCUMENTS

| | | |
|---|---|---|
| 6,707,905 B2 | 3/2004 | Lenard |
| 6,829,583 B1 | 12/2004 | Knapp et al. |
| 6,839,566 B2 | 1/2005 | Casaccia et al. |
| 6,876,993 B2 | 4/2005 | LaButte et al. |
| 7,089,208 B1 | 8/2006 | Levchin et al. |
| 7,254,406 B2 | 8/2007 | Beros et al. |
| 7,349,871 B2 | 3/2008 | Labrou et al. |
| 7,376,587 B1 | 5/2008 | Neofytides et al. |
| 7,580,719 B2 | 8/2009 | Karmarkar |
| 7,606,734 B2 | 10/2009 | Baig et al. |
| 7,620,404 B2 | 11/2009 | Chesnais et al. |
| 7,694,287 B2 | 4/2010 | Singh et al. |
| 7,783,537 B1 | 8/2010 | Van Luchene et al. |
| 8,010,601 B2 | 8/2011 | Jennings et al. |
| 8,090,616 B2 | 1/2012 | Proctor, Jr. et al. |
| 8,208,388 B2 | 6/2012 | Casaccia et al. |
| 8,385,964 B2 | 2/2013 | Haney |
| 8,408,992 B2 | 4/2013 | de Cuba |
| 8,428,079 B1 | 4/2013 | Lambert et al. |
| 8,571,975 B1 | 10/2013 | Lehman et al. |
| 8,606,703 B1 | 12/2013 | Dorsey et al. |
| 8,661,046 B2 | 2/2014 | King et al. |
| 8,694,435 B1 | 4/2014 | Bishop |
| 8,751,379 B1 | 6/2014 | Bueche, Jr. |
| 8,762,272 B1 | 6/2014 | Cozens et al. |
| 9,264,850 B1 | 2/2016 | Lee |
| 9,378,491 B1 | 6/2016 | Grassadonia et al. |
| 9,652,769 B1* | 5/2017 | Golin ............... G06Q 20/38215 |
| 9,710,821 B2 | 7/2017 | Heath |
| 9,715,709 B2 | 7/2017 | Carlson |
| 9,767,443 B1 | 9/2017 | Wilson et al. |
| 9,799,071 B1 | 10/2017 | Wilson et al. |
| 9,805,358 B2 | 10/2017 | Green et al. |
| 10,339,506 B2 | 7/2019 | Kassemi et al. |
| 10,387,874 B1* | 8/2019 | Birand ................ G06Q 20/385 |
| 10,552,828 B2* | 2/2020 | Hammad ............. G06Q 20/382 |
| 10,614,445 B1 | 4/2020 | Dorsey et al. |
| 10,769,619 B2 | 9/2020 | Bennett |
| 10,963,868 B1* | 3/2021 | McCauley .......... G06Q 20/367 |
| 11,354,645 B1 | 6/2022 | Dorsey et al. |
| 2001/0014878 A1 | 8/2001 | Mitra et al. |
| 2002/0114442 A1 | 8/2002 | Lieberman et al. |
| 2003/0037074 A1 | 2/2003 | Dwork et al. |
| 2003/0045272 A1 | 3/2003 | Burr |
| 2003/0061170 A1 | 3/2003 | Uzo |
| 2003/0120936 A1 | 6/2003 | Farris et al. |
| 2004/0039630 A1 | 2/2004 | Begole et al. |
| 2004/0148252 A1 | 7/2004 | Fleishman |
| 2004/0177005 A1 | 9/2004 | Poltorak |
| 2004/0264466 A1 | 12/2004 | Huang |
| 2005/0174975 A1 | 8/2005 | Mgrdechian et al. |
| 2005/0286686 A1 | 12/2005 | Krstulich |
| 2006/0148532 A1 | 7/2006 | Schnurr |
| 2006/0224542 A1 | 10/2006 | Yalamanchi |
| 2006/0235796 A1 | 10/2006 | Johnson et al. |
| 2006/0277550 A1 | 12/2006 | Williams et al. |
| 2007/0124721 A1 | 5/2007 | Cowing et al. |
| 2007/0136118 A1 | 6/2007 | Gerlach et al. |
| 2007/0150411 A1 | 6/2007 | Addepalli et al. |
| 2007/0203836 A1 | 8/2007 | Dodin |
| 2007/0208816 A1 | 9/2007 | Baldwin et al. |
| 2007/0255652 A1 | 11/2007 | Tumminaro et al. |
| 2007/0255653 A1 | 11/2007 | Tumminaro et al. |
| 2007/0265984 A1 | 11/2007 | Santhana |
| 2008/0010190 A1 | 1/2008 | Rackley, III et al. |
| 2008/0154798 A1 | 6/2008 | Valz |
| 2008/0162340 A1 | 7/2008 | Zimmer et al. |
| 2008/0182591 A1 | 7/2008 | Krikorian |
| 2009/0063353 A1 | 3/2009 | Viidu et al. |
| 2009/0070263 A1 | 3/2009 | Davis et al. |
| 2009/0157652 A1 | 6/2009 | Barbosa et al. |
| 2009/0164374 A1 | 6/2009 | Shastry |
| 2009/0281817 A1 | 11/2009 | Ferrara et al. |
| 2010/0082481 A1 | 4/2010 | Lin et al. |
| 2010/0169264 A1 | 7/2010 | O' Sullivan et al. |
| 2010/0211592 A1 | 8/2010 | Brownlee |
| 2010/0211938 A1 | 8/2010 | Singh et al. |
| 2010/0250682 A1 | 9/2010 | Goldberg et al. |
| 2010/0268648 A1 | 10/2010 | Wiesman et al. |
| 2010/0312626 A1* | 12/2010 | Cervenka ............... G06Q 20/12 705/14.17 |
| 2011/0078260 A1 | 3/2011 | Rashad et al. |
| 2011/0087742 A1 | 4/2011 | Deluca et al. |
| 2011/0119190 A1* | 5/2011 | Mina ..................... G06Q 20/12 705/44 |
| 2011/0145152 A1 | 6/2011 | McCown |
| 2011/0178883 A1 | 7/2011 | Granbery et al. |
| 2011/0231292 A1 | 9/2011 | McCown |
| 2011/0251892 A1 | 10/2011 | Laracey |
| 2012/0054102 A1 | 3/2012 | Schwartz et al. |
| 2012/0095905 A1 | 4/2012 | Hodges |
| 2012/0130903 A1 | 5/2012 | Dorsey et al. |
| 2012/0158589 A1* | 6/2012 | Katzin ................. G06Q 20/384 705/44 |
| 2012/0209749 A1* | 8/2012 | Hammad ............... G06Q 20/20 705/27.1 |
| 2012/0246252 A1 | 9/2012 | Denise |
| 2012/0253852 A1 | 10/2012 | Pourfallah et al. |
| 2012/0259782 A1 | 10/2012 | Hammad |
| 2013/0024506 A1 | 1/2013 | Setton |
| 2013/0060708 A1 | 3/2013 | Oskolkov et al. |
| 2013/0085931 A1 | 4/2013 | Runyan |
| 2013/0110656 A1 | 5/2013 | Chau et al. |
| 2013/0132502 A1 | 5/2013 | Stacey et al. |
| 2013/0229930 A1 | 9/2013 | Akay et al. |
| 2013/0232075 A1* | 9/2013 | Monaghan ........... G06Q 20/403 705/44 |
| 2013/0275301 A1 | 10/2013 | Lehman et al. |
| 2013/0290234 A1 | 10/2013 | Harris et al. |
| 2013/0297385 A1* | 11/2013 | Mehta ..................... G06F 21/10 705/7.35 |
| 2013/0316808 A1 | 11/2013 | Nelson et al. |
| 2013/0332344 A1 | 12/2013 | Weber |
| 2014/0019341 A1 | 1/2014 | Frohwein |
| 2014/0025958 A1 | 1/2014 | Calman |
| 2014/0046851 A1 | 2/2014 | Lehman et al. |
| 2014/0108247 A1 | 4/2014 | Artman et al. |
| 2014/0136352 A1 | 5/2014 | Ramakrishna et al. |
| 2014/0172531 A1* | 6/2014 | Liberty .............. G06Q 20/3276 705/14.23 |
| 2014/0181934 A1 | 6/2014 | Mayblum et al. |
| 2014/0207679 A1* | 7/2014 | Cho .................... G06Q 20/3229 705/44 |
| 2014/0222595 A1 | 8/2014 | Fernandes |
| 2014/0254575 A1 | 9/2014 | Venkatraman et al. |
| 2014/0279436 A1 | 9/2014 | Dorsey et al. |
| 2014/0279444 A1 | 9/2014 | Kassemi et al. |
| 2014/0279447 A1* | 9/2014 | Dorsey ................. G06Q 20/023 705/39 |
| 2014/0279474 A1 | 9/2014 | Evans et al. |
| 2014/0279556 A1 | 9/2014 | Priebatsch et al. |
| 2014/0304510 A1 | 10/2014 | Sannegowda et al. |
| 2014/0348143 A1 | 11/2014 | Kato et al. |
| 2014/0372308 A1* | 12/2014 | Sheets ................. G06Q 20/3226 705/44 |
| 2015/0031393 A1 | 1/2015 | Post et al. |
| 2015/0081462 A1 | 3/2015 | Ozvat et al. |
| 2015/0088754 A1 | 3/2015 | Kirsch |
| 2015/0100482 A1 | 4/2015 | Zamer et al. |
| 2015/0170092 A1 | 6/2015 | Klein |
| 2015/0186887 A1 | 7/2015 | Khan et al. |
| 2015/0339696 A1* | 11/2015 | Zhou .................... G06Q 20/387 705/14.23 |
| 2015/0358476 A1 | 12/2015 | Flores-Estrada |

(56) References Cited

U.S. PATENT DOCUMENTS

| | | | |
|---|---|---|---|
| 2016/0019536 A1* | 1/2016 | Ortiz | G06Q 20/3227 |
| | | | 705/67 |
| 2016/0042379 A1* | 2/2016 | Lupoli | G08B 21/22 |
| | | | 705/14.16 |
| 2016/0048830 A1 | 2/2016 | Laracey | |
| 2016/0117670 A1 | 4/2016 | Davis | |
| 2016/0125369 A1 | 5/2016 | Grassadonia et al. | |
| 2016/0277560 A1 | 9/2016 | Gruberman et al. | |
| 2017/0287022 A1 | 10/2017 | Capps et al. | |
| 2021/0117940 A1 | 4/2021 | Grassadonia et al. | |

OTHER PUBLICATIONS

"A Secure Mobile Payment System using GR Code"; Sana Nseir, Nael Hirzallah, Musbah Aqel; 2013 5th International Conference on Computer Science and Information Technology (CSIT). (Year: 2013).*
"Anonymous Payment in a Client Centric Model for Digital Ecosystems"; Jesu's Tellez Isaac and Jose Sierra Caimara; 2007 Inaugural IEEE International Conference on Digital Ecosystems and Technologies (IEEE DEST 2007) (Year: 2007).*
Research Article: "Security Enhanced EMV-Based Mobile Payment Protocol"; Ming-Hour Yang; Hindawi Publishing Corporation, The Scientific World Journal, vol. 2014, Article ID 864571, 19 pages; http://dx.doi.Org/10.1155/2014/864571 (Year: 2014).*
Non-Final Office Action dated May 13, 2021 for U.S. Appl. No. 14/754,223, of Grassadonia, B., et al., filed Jun. 29, 2015.
Church, K.W., "A stochastic parts program and noun phrase parser for unrestricted text," Proceedings of the second conference on Applied natural language processing, pp. 136-143 (Feb. 9, 1988).
Cover, T. M., and Thomas, J. A., "Elements of Information Theory," John Wiley and Sons, Inc. Publication, New York (1991), pp. 1-140, at http://www.cs-114.org/wp-content/uploads/2015/01/Elements_of_Information_Theory_Elements.pdf. [Part-1].
Cover, T. M., and Thomas, J. A., "Elements of Information Theory," John Wiley and Sons, Inc. Publication, New York (1991), pp. 141-281, at http://www.cs-114.org/wp-content/uploads/2015/01/Elements_of_Information_Theory_Elements.pdf. [Part-2].
Cover, T. M., and Thomas, J. A., "Elements of Information Theory," John Wiley and Sons, Inc. Publication, New York (1991), pp. 282-419, at http://www.cs-114.org/wp-content/uploads/2015/01/Elements_of_Information_Theory_Elements.pdf. [Part-3].
Cover, T. M., and Thomas, J. A., "Elements of Information Theory," John Wiley and Sons, Inc. Publication, New York (1991), pp. 420-563, at http://www.cs-114.org/wp-content/uploads/2015/01/Elements_of_Information_Theory_Elements.pdf. [Part-4].
Derouault, A. M., and Merialdo, B., "Probabilistic grammar for phonetic to French transcription," ICASSP '85, IEEE International Conference on Acoustics, Speech, and Signal Processing, pp. 1577-1580 (1985), at https://ieeexplore.ieee.org/abstract/document/1168078/.
European Patent Office; "EPO Summary of Arguments", Minutes of the Oral Proceedings before the Examining Division; Sep. 22, 2015; Munich, DE.
Magerman, D.M., "Natural Language Parsing as Statistical Pattern Recognition," PhD Thesis, Stanford University, dated Feb. 1994, pp. 1-158.
Magerman, D.M., "Parsing as Statistical Pattern Recognition," IBM T. J. Watson Research Center, dated Jan. 16, 1995, pp. 1-15.
Gao, J., et al. "A 2D Barcode-Based Mobile Payment System", 2009 Third International Conference on Multimedia and Ubiquitous Engineering, 11 pages (2009).
Nseir, S., et al. "A Secure Mobile Payment System using QR Code", 2013 5th International Conference on Computer Science and Information Technology (CSIT), 4 pages (2013).
Isaac, J.T., et al. "Anonymous Payment in a Client Centric Model for Digital Ecosystems", 2007 Inaugural IEEE International Conference on Digital Ecosystems and Technologies (IEEE DEST 2007), 6 pages.

Yang, Ming-Hour "Security Enhanced EMV-Based Mobile Payment Protocol", Hindawi Publishing Corporation, The Scientific World Journal, vol. 2014, Article ID 864571, 19 pages; http://dx.doi.org/10.1155/2014/864571 (2014).
Non-Final Office Action dated Jan. 5, 2015 for U.S. Appl. No. 14/284,227, of Wilson, J., et al., filed May 21, 2014.
Final Office Action dated Jun. 25, 2015 for U.S. Appl. No. 14/284,227, of Wilson, J., et al., filed May 21, 2014.
Non-Final Office Action dated Feb. 2, 2016, for U.S. Appl. No. 14/754,223, of Grassadonia, B., et al., filed Jun. 29, 2015.
Non-Final Office Action dated Mar. 24, 2016 for U.S. Appl. No. 14/284,227, of Wilson, J., et al., filed May 21, 2014.
Non-Final Office Action dated Mar. 25, 2016, for U.S. Appl. No. 14/276,659, of Wilson, J., et al., filed May 13, 2014.
Non-Final Office Action dated Aug. 11, 2016, for U.S. Appl. No. 14/296,385, of Dorsey, J., et al., filed Jun. 4, 2014.
Final Office Action dated Aug. 12, 2016, for U.S. Appl. No. 14/754,223, of Grassadonia, B., et al., filed Jun. 29, 2015.
Non-Final Office Action dated Aug. 30, 2016, for U.S. Appl. No. 14/444,741, of Seemann, D., et al., filed Jul. 28, 2014.
Final Office Action dated Sep. 29, 2016, for U.S. Appl. No. 14/276,659, of Wilson, J., et al., filed May 13, 2014.
Final Office Action dated Oct. 6, 2016 for U.S. Appl. No. 14/284,227, of Wilson, J., et al., filed May 21, 2014.
Non-Final Office Action dated Nov. 18, 2016, for U.S. Appl. No. 14/296,385, of Dorsey, J., et al., filed Jun. 4, 2014.
Advisory Action dated Dec. 15, 2016, for U.S. Appl. No. 14/754,223, of Grassadonia, B., et al., filed Jun. 29, 2015.
Advisory Action dated Jan. 12, 2017 for U.S. Appl. No. 14/284,227, of Wilson, J., et al., filed May 21, 2014.
Non-Final Office Action dated Jan. 20, 2017, for U.S. Appl. No. 14/276,659, of Wilson, J., et al., filed May 13, 2014.
Notice of Allowance dated May 30, 2017, for U.S. Appl. No. 14/276,659, of Wilson, J., et al., filed May 13, 2014.
Notice of Allowance dated Jun. 30, 2017 for U.S. Appl. No. 14/284,227, of Wilson, J., et al., filed May 21, 2014.
Final Office Action dated Jul. 10, 2017 for U.S. Appl. No. 14/296,385, of Dorsey, J., et al., filed Jun. 4, 2014.
Non-Final Office Action dated Aug. 24, 2017, for U.S. Appl. No. 14/481,760, of McCauley, N.P., et al., filed Sep. 9, 2014.
Final Office Action dated Oct. 6, 2017, for U.S. Appl. No. 14/444,741, of Seemann, D., et al., filed Jul. 28, 2014.
Non-Final Office Action dated Mar. 9, 2018, for U.S. Appl. No. 14/754,223, of Grassadonia, B., et al., filed Jun. 29, 2015.
Non-Final Office Action dated Apr. 26, 2018 for U.S. Appl. No. 14/296,385, of Dorsey, J., et al., filed Jun. 4, 2014.
Final Office Action dated May 15, 2018, for U.S. Appl. No. 14/481,760, of McCauley, N.P., et al., filed Sep. 9, 2014.
Non-Final Office Action dated Aug. 10, 2018, for U.S. Appl. No. 14/444,741, of Seemann, D., et al., filed Jul. 28, 2014.
Advisory Action dated Aug. 27, 2018 for U.S. Appl. No. 14/481,760, of McCauley, N.P., et al., filed Sep. 9, 2014.
Final Office Action dated Oct. 19, 2018, for U.S. Appl. No. 14/754,223, of Grassadonia, B., et al., filed Jun. 29, 2015.
Final Office Action dated Dec. 10, 2018, for U.S. Appl. No. 14/296,385, of Dorsey, J., et al., filed Jun. 4, 2014.
Non-Final Office Action dated May 2, 2019, for U.S. Appl. No. 14/481,760, of McCauley, N.P., et al., filed Sep. 9, 2014.
Final Office Action dated Jul. 8, 2019, for U.S. Appl. No. 14/444,741, of Seemann, D., et al., filed Jul. 28, 2014.
Non-Final Office Action dated Oct. 8, 2019, for U.S. Appl. No. 14/754,223, of Grassadonia, B., et al., filed Jun. 29, 2015.
Notice of Allowance dated Nov. 27, 2019, for U.S. Appl. No. 14/296,385, of Dorsey, J., et al., filed Jun. 4, 2014.
Advisory Action dated Dec. 4, 2019 for U.S. Appl. No. 14/444,741, of Seemann, D., et al., filed Jul. 28, 2014.
Final Office Action dated Feb. 4, 2020, for U.S. Appl. No. 14/481,760, of McCauley, N.P., et al., filed Sep. 9, 2014.
Final Office Action dated Apr. 6, 2020, for U.S. Appl. No. 14/754,223, of Grassadonia, B., et al., filed Jun. 29, 2015.
Advisory Action dated Jun. 9, 2020 for U.S. Appl. No. 14/754,223, of Grassadonia, B., et al., filed Jun. 29, 2015.

(56) References Cited

OTHER PUBLICATIONS

Notice of Allowance dated Nov. 25, 2020, for U.S. Appl. No. 14/481,760, of McCauley, N.P., et al., filed Sep. 9, 2014.
International Search Report and Written Opinion for International Application No. PCT/US2015/058168, dated Apr. 12, 2016.
Non-Final Office Action dated Jul. 30, 2021 for U.S. Appl. No. 16/828,817, of Dorsey, J., et al., filed Mar. 24, 2020.
Zhu, Y.,"A new architecture for secure two-party mobile payment transactions", (Order No. MR68790), Available from ProQuest Dissertations and Theses Professional. (822410582). Retrieved from: https://dialog.proquest.com/professional/docview/822410582?accountid=131444, (2010).
Non-Final Office Action dated Sep. 16, 2021 for U.S. Appl. No. 17/138,702, of Grassadonia, B., et al., filed Dec. 30, 2020.
Final Office Action dated Oct. 5, 2021 for U.S. Appl. No. 14/754,223, of Grassadonia, B., et al., filed Jun. 29, 2015.
Final Office Action dated Feb. 7, 2022 for U.S. Appl. No. 17/138,702, of Grassadonia, B., et al., filed Dec. 30, 2020, 7 pages.
Notice of Allowance dated Feb. 10, 2022 for U.S. Appl. No. 16/828,817, of Dorsey, J., et al., filed Mar. 24, 2020, 11 pages.
Notice of Allowance dated Feb. 16, 2022 for U.S. Appl. No. 14/754,223, of Grassadonia, B., et al., filed Jun. 29, 2015, 12 pages.
Corrected Notice of Allowability dated Mar. 2, 2022 for U.S. Appl. No. 14/754,223, of Grassadonia, B., et al., filed Jun. 29, 2015.
Notice of Allowance dated Mar. 3, 2022 for U.S. Appl. No. 16/828,817, of Dorsey, J., et al., filed Mar. 24, 2020.
Non-Final Office Action dated Mar. 16, 2022 for U.S. Appl. No. 17/138,702, of Grassadonia, B., et al., filed Dec. 30, 2020.
Non-Final Office Action dated May 12, 2022 for U.S. Appl. No. 17/138,702, of Grassadonia, B., et al., filed Dec. 30, 2020.
Notice of Allowance dated Jun. 23, 2022 for U.S. Appl. No. 17/138,702, of Grassadonia, B., et al., filed Dec. 30, 2020.
Ex Parte Quayle dated Jun. 24, 2022 for U.S. Appl. No. 17/711,364, of Grassadonia, B., et al., filed Apr. 1, 2022.

* cited by examiner

ANONYMOUS PAYMENT TRANSACTIONS

PRIORITY

This application is a continuation under 35 U.S.C. § 120 of U.S. patent application Ser. No. 14/481,760, filed 9 Sep. 2014, now U.S. Pat. No. 10,963,868, which is incorporated herein by reference.

BACKGROUND

As society becomes increasingly "cashless" through the increased use of electronic wallets and other digital forms of money transfer, peer-to-peer money transfers ("P2P transfers") are becoming increasingly popular between individuals, who may or may not personally know each other. An example is the payment of an "IOU" debt from an individual (payer) to an acquaintance (payee) at a social group outing, where the individual and the distant acquaintance may never socialize again. Another example is the buying and selling of goods at an arts-and-crafts fair, where a buyer (payer) makes a payment to a seller (payee) whom the buyer may never see again.

Decreased reliance on cash often means that individuals have insufficient cash on hand, or even paper checks. Further, for a payee who participates in frequent P2P transfers (e.g., arts-and-crafts fair seller), managing and tracking money transfers from multiple payers can be cumbersome and highly inconvenient. The more convenient payment methods, such as credit cards or bank account debits through electronic funds transfers (EFT), are often available only to retail businesses, as opposed to individual payers and payees. However, even if such payment methods were available, completion of the payments often requires an account setup between the individual payers and payees, necessitating the individuals to reveal information about their personal identities.

BRIEF DESCRIPTION OF DRAWINGS

One or more embodiments of the disclosed technology are illustrated by way of example, and are not intended to be limited, in the figures of the accompanying drawings, in which like references indicate similar elements or components.

DETAILED DESCRIPTION

Figure 1:
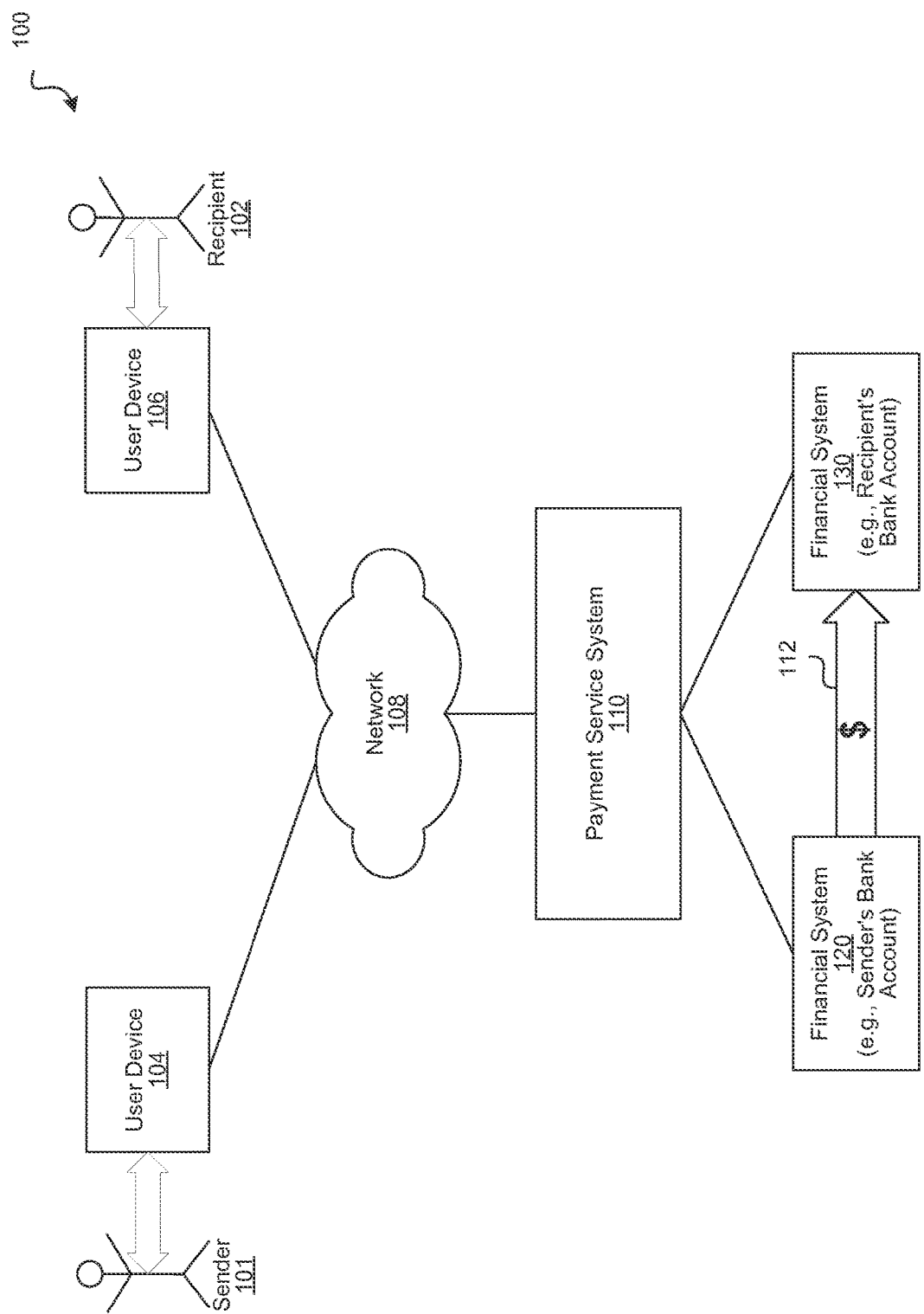
FIG. 1 is a block diagram illustrating a network-based environment within which some embodiments of the disclosed technology can be implemented.

Technology is disclosed for transferring money anonymously between a payer and a payee ("the disclosed technology"). The term "money transfer" as used here refers to a financial transfer between two individuals' financial accounts that can be fulfilled by using debit "rails" (e.g., bank account deposit) or by using credit "rails" (e.g., credit account charge-back). The term "rails" as used here refers to a series of processing pathways between financial institutions to execute payment transactions from/to desired funding sources. That is, credit rails refer to the pathways of a payment flow to a credit account while debit rails refer to the pathways of a payment flow to a debit account. The term "payee" as used here refers to an individual who wishes to receive, or to be sent, money from another individual (payer). The term "payer" as used here refers to an individual who wishes to provide, or send, money to the payee. The term "payee" may be used synonymously throughout the description with the terms "recipient" or "merchant" without any intended change in meaning. The term "payer" may be used synonymously throughout the description with the terms "sender," "customer," or "consumer" without any intended change in meaning.

Briefly described, the disclosed technology enables the payee to receive money (e.g., electronic funds or credit) by use of an anonymizing token, which serves as an identification of the payee for the payer to utilize in sending the money. In some embodiments, the disclosed technology involves communication between a mobile payment application installed on the payee's mobile device, the payer's mobile device, and an intermediary payment service system (PSS). The mobile payment application enables the payee to request for an anonymizing token by submitting the payee's identification information. Upon receiving the request, the mobile payment application generates the anonymizing token for the payee (e.g., display the token on a user interface of the mobile payment application), and transmits the generated anonymizing token and the submitted payee's identification information to the PSS, which stores the token in association with the identification information. The payee, on the other hand, provides the anonymizing token to the payer, for example, through a communication broadcast (e.g., over Wi-Fi®, Bluetooth®, Bluetooth® Low Energy, Apple® AirDrop®, etc.), a scanning of a Quick Response Code (QR code), an email message, or the like. With the anonymizing token, the payer sends a request message to the PSS for a transfer of money, where the request message includes, among other things, the anonymizing token to indicate to whom the money should be transferred. The PSS identifies the payer's financial account based on information included in the request message and the payee's financial account based on the stored association between the anonymizing token and the payee's identification information. Upon successful identification, the PSS executes or triggers execution of the transfer of money.

Among other benefits, the disclosed technology provides a means for individuals to transfer money anonymously, and particularly makes that transfer relatively quick and easy as compared to traditional methods. In particular, use of the anonymizing token enables the payee to receive money without having to reveal the payee's identification information (e.g., personal email address, financial account information, etc.) to the payer. Further, since use of the anonymizing token necessitates the payer to communicate through the PSS, the payer's own identification information is also not revealed to the payee when the money gets transferred.

Consider the following example of an arts-and-crafts fair merchant (e.g., a wood sculptor) initiating the process for money to be transferred to him from one or more arts-and-crafts fair customers. Note that this example is discussed to explain various aspects of the disclosed technology for illustrative purposes only, and that the disclosed technology is not limited in applicability to a arts-and-crafts fair operation or any other particular kind of business. Additionally, the disclosed technology can be employed with any transaction that traditionally would be initiated by, or involve the use of, a payment card or a financial account. Thus, the term "transaction" refers to any exchange of goods and/or services of monetary value. For example, the transaction can be a payment of an "IOU" debt between two individuals who wish to protect their respective identity information.

According to an embodiment of the disclosed technology, to initiate a transfer of money, the arts-and-crafts fair merchant first launches a mobile payment application installed on his mobile device. In the embodiment, the mobile payment application, which is in communication with the PSS, is an application that executes on a mobile computing device. The mobile payment application generates one or more anonymizing tokens as requested by a user of the application (e.g., the arts-and-crafts fair merchant). In some embodiments, the mobile payment application receives information from the user and relays that information to the PSS. The PSS, in turn, generates the anonymizing token and transmits it to the mobile payment application for display to the user.

Referring back to the example, to initiate the generation of the anonymizing token, the arts-and-crafts fair merchant (i.e., payee) first inputs information into the mobile payment application to request for the token. In some embodiments, the information can simply be the arts-and-crafts fair merchant's identification information (e.g., email address, driver's license number, device ID, financial account information identifying the arts-and-crafts fair merchant's financial account, etc.). In some embodiments, the information can also include transaction information associated with a transaction for which the money transfer is requested. For example, the transaction is a purchase of two wooden chairs handmade by the arts-and-crafts fair merchant. The transaction information can include, for example, a transaction ID, a transaction date and/or time, a transaction amount, a list of one or more transaction items (e.g., wooden chairs), etc.

After the arts-and-crafts fair merchant has finished inputting all of the information, the mobile payment application generates the anonymizing token for the arts-and-crafts fair merchant. The mobile payment application sends to the PSS the generated anonymizing token along with at least a portion of the information inputted by the arts-and-crafts fair merchant (e.g., identification information, transaction information, etc.). Upon receipt, the PSS stores the anonymizing token in association with the received information for use in identifying the arts-and-crafts fair merchant and/or the transaction in future transactions. In some embodiments, the mobile payment application communicates all of the information inputted by the arts-and-crafts fair merchant to the PSS, which then generates the anonymizing token, and sends it back to the mobile payment application. In such embodiments, the PSS, after generating the anonymizing, stores the anonymizing token (e.g., a copy of the anonymizing token) in association with at least a portion of the information (e.g., identification information, transaction information, etc.) The anonymizing token can be a Quick Response code ("QR code"), an image, a string of characters, an encrypted message, a globally unique identifier, etc. The anonymizing token is generated for the arts-and-crafts fair merchant to utilize separately from the identification information, which is only known by the PSS based on the stored association. Thus, use of the anonymizing token enables the arts-and-crafts fair merchant to protect his personal identification information from being revealed to any customer who receives the token and, at the same time, to identify himself as a recipient of money in a transaction with any customer.

Upon receiving the anonymizing token, the arts-and-crafts fair merchant provides the token to any customer who wishes to send the merchant money, e.g., to make a purchase from the arts-and-crafts fair merchant. In some embodiments, the arts-and-crafts fair merchant, using his mobile device, can broadcast the anonymizing token to nearby customers. For example, the anonymizing token is an image that can be transmitted to a customer's mobile device using AirDrop®.

A customer, who has received the anonymizing token, can send a money transfer request to the arts-and-crafts fair merchant by communicating with the PSS. In particular, the customer submits the anonymizing token with the request when she communicates with the PSS. The customer can also submit other information with the request, such as a transfer amount to be transferred to the arts-and-crafts fair merchant, transaction information (e.g., list of items the customer is purchasing from the merchant), and/or the customer's identification information (e.g., name, email address, driver's license number, financial account information identifying the customer's financial account, etc.).

In some embodiments, the customer can send the money transfer request to the PSS by using a mobile payment application installed on the customer's mobile device. The mobile payment application can be a different application or the same application utilized by the arts-and-crafts fair merchant. The mobile payment application sends the request, along with the anonymizing token and any other information (e.g., transfer amount), to the PSS for processing.

In some embodiments, the customer can send the money transfer request to the PSS by using an email mechanism. In such embodiments, the customer composes an email, e.g., using a native email application installed on the customer's mobile device, and attaches the anonymizing token in the email. The customer can also include other information in the body or subject line of the email (e.g., transfer amount, transaction information, the customer's identification, etc.). Note that the email itself can include the customer's email address, which can serve as the customer's identification to be used by the PSS in processing the money transfer request. Other mechanisms can be utilized by the customer to send the money transfer request to the PSS, for example, a short message service (SMS) mechanism or a web interface mechanism.

Upon receiving the request, the PSS analyzes the anonymizing token to determine the identity and associated financial account of the payee to whom the transfer amount should be transferred (i.e., the arts-and-crafts fair merchant).

In particular, the PSS accesses a database of the PSS to identify a matching anonymizing token and any identification information that is stored in association with the token. In one example, the associated identification information can include an email address of the arts-and-crafts fair merchant. In this example, the PSS can further identify whether the email address is associated with a financial account of the arts-and-crafts fair merchant. For example, the arts-and-crafts fair merchant has previously provided financial account information identifying the account to the PSS, e.g., to facilitate the money transfer. In another example, the associated identification information includes the financial account information of the arts-and-crafts fair merchant.

The PSS further analyzes any other information included in the request, such as the customer's identification information, to determine the identity and associated financial account of the payer (i.e., customer) who has sent the request. In one example, the identification information can be the customer's financial account information identifying a financial account of the customer. In another example, the identification information can be a username associated with the mobile payment application from which the request has been sent. In this example, the PSS can access its database to identify the username and a financial account previously stored in association with that username. In another example, the identification information can be the email address of the email sender in the email request (i.e., the customer's email address). In this example, the PSS can access its database to identify the email address and a financial account previously stored in association with that email address.

Upon successful identification of the respective financial accounts of the customer and the arts-and-crafts fair merchant, the PSS executes or triggers execution of the transfer of money from the customer's financial account to the arts-and-crafts fair merchant's financial account. In some embodiments, the PSS performs an additional step of verifying the sufficiency of funds in the customer's financial account before executing, or triggering execution of, the transfer of money.

In some embodiments, if the PSS is unable to identify the financial account of either the arts-and-crafts fair merchant or the customer, the PSS communicates with the respective individual (e.g., through mobile payment application) to obtain the missing financial account information. In such embodiments, the PSS can prompt the respective individual to submit and/or link a payment card (e.g., debit card or credit card) to the individual's identification information (e.g., email address). For example, the PSS causes the mobile payment application to prompt the respective individual to input payment card information (e.g., card number, expiration date, CVV, etc.) of a payment card that identifies a financial account of the respective individual. Upon receiving the respective missing payment card information, the PSS can proceed with executing or triggering execution of the transfer of money.

Although the example provided above uses a mobile device to initiate the process for transfer of money according to the embodiment described above, in other embodiments a processing device other than a mobile device may be used to initiate that process, such as a conventional personal computer (PC). In such embodiments, the mobile payment application can be replaced by a more conventional software application in such processing device, where such software application has functionality similar to that of the mobile payment application as described here.

References in this description to "an embodiment", "one embodiment" or the like, mean that the particular feature, function, structure or characteristic being described is included in at least one embodiment of the disclosed technology. Occurrences of such phrases in this specification do not necessarily all refer to the same embodiment. On the other hand, the embodiments referred to also are not necessarily mutually exclusive.

Additionally, the terminology used in this description is to be interpreted in its broadest reasonable manner, even though it is being used in conjunction with a detailed description of certain specific embodiments of the disclosed technology. Indeed, certain terms may even be emphasized below; however, any terminology intended to be interpreted in any restricted manner will be overtly and specifically defined as such in this Detailed Description section.

As used herein, a "module," "a manager," an "interface," a "platform," or an "engine" includes a general purpose, dedicated or shared processor and, typically, firmware or software modules that are executed by the processor. Depending upon implementation-specific or other considerations, the module, manager, interface, platform, or engine can be centralized or its functionality distributed. The module, manager, interface, platform, or engine can include general or special purpose hardware, firmware, or software embodied in a computer-readable (storage) medium for execution by the processor. As used herein, a computer-readable medium or computer-readable storage medium is intended to include all media that are statutory (e.g., in the United States, under 35 U.S.C. § 101), and to specifically exclude all media that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

FIG. 1 is a block diagram illustrating a network-based environment 100 within which some embodiments of the disclosed technology can be implemented. The environment 100 includes a first user device 104 belonging to a user 101 and a second user device 106 belonging to a user 102. The user 101 may be referred to as a "sender," a "payer," a "customer," or a "consumer" depending on the context of the examples being described throughout the description, without any intended change in meaning or functionality associated with the user 101. The user 102 may be referred to as a "recipient," a "payee," or a "merchant," depending on the context of the examples being described throughout the description. The user devices 104, 106 can be any computing device capable of general purpose processing and data communications. In one example, each user device 104, 106 can be a smart phone, tablet computer, notebook computer, or any other form of mobile processing device. In another example, each user device 104, 106 can be a desktop computer, a stationary point-of-sale (POS) computer, or any other form of non-mobile processing device. An application can run, or execute, on the user device 104, 106. The application can be a mobile application, e.g., executing on a mobile computing device, or a conventional software application, e.g., executing on a conventional personal computer (PC).

The environment also includes a computer system 110 of an intermediary payment service (hereinafter, "payment service system 110"), a computer system 120 of a financial institution (hereinafter, "financial system 120"), which is associated with the user 101, and a computer system 130 of another financial institution (hereinafter, "financial system 130"), which is associated with the user 102. The financial systems 120, 130 can each include an acquirer computer system, an issuing bank computer system, and/or a card payment network computer system. Each of the aforementioned computer systems can include one or more distinct physical computers and/or other processing devices which, in the case of multiple devices, can be connected to each other through one or more wired and/or wireless networks.

All of the aforementioned devices and computer systems are coupled in communication for data transmission over a network 108, which can be or include the Internet and one or more wireless networks (e.g., a WiFi network and/or a cellular telecommunications network). The technologies supporting the communications between the user devices 104, 106, the payment service system 110, and the financial systems 120, 130 can include Ethernet (e.g., as described in IEEE 802.3 family of standards) and/or other suitable types of area network technologies.

According to one embodiment of the disclosed technology, the PSS 110 receives a request associated with a transaction, such as a sales transaction (e.g., a purchase) or a money transfer (e.g., peer-to-peer transfer for an "IOU" debt), and facilitates that transaction in response to the request. In a first part, the PSS 110 receives a request to generate a token from the user device 106 of the recipient 102, where the recipient 102 inputs some information in the request. In some embodiments, the information can include, for example, identification information of the recipient 102. In such embodiments, the PSS generates the token in response to the request, and associates the generated token with the identification information. The association between the generated token and the identification information is then stored by the PSS, e.g., in a database of the PSS. For example, the token is a string of characters "ABC1234," and the PSS stores "ABC1234" in association with an email address of the recipient 102 (i.e., the identification information of the recipient 102). In some embodiments, the information can include transaction information associated with a transaction in which the recipient 102 wishes to receive money. In such embodiments, the PSS generates the token and associates that token with the transaction information, where the association between the token and the transaction information is stored by the PSS, e.g., in a database. For example, the token is a QR code, and the PSS stores content of the QR code in association with a transaction ID provided by the recipient 102 (i.e., the transaction information).

Upon storing the association between the token and the information, the PSS 110 transmits the token back to the user device 106 for display to the recipient 102. Note that in other embodiments, the PSS 110 can communicate with a mobile application installed on the user device 106 to facilitate generation of the token. In such embodiments, the mobile application, upon receiving the request with the inputted information from the recipient 102, generates the token and transmits the generated token (e.g., a copy of the generated token) and the information to the PSS, which associates the token with the information and stores such association for use in future transactions.

In a second part, the recipient 102, upon receiving the generated token, communicates with the sender 101 to transmit the token to the sender 101, e.g., by using the user device 106 to communicate with the user device 104. In a third part, the sender 101 transmits the token to the PSS 110 to request that money be transferred to an individual identified by the token, i.e., the recipient 102. The sender 101 can transmit the token by an email mechanism, an SMS mechanism, a web interface mechanism, a mobile application mechanism, or the like. For example, the sender 101 submits a money transfer request to the PSS 110 in the form of an SMS message that includes the token, where the SMS message is sent to a telephone number associated with the PSS 110. The PSS 110 receives the request from the sender 101 and, in turn, executes the transfer of money.

In some embodiments, the PSS 110 communicates with the financial system 120 that facilitates the financial account of the sender 101. In such embodiments, the PSS 110 can, for example, route an authorization request to the financial system 120. If the transaction is approved or authorized by the financial system 120, a payment authorization message is sent from the financial account 120 to the PSS 110. Once the transaction is authorized, settlement and clearing occurs. During settlement and clearing, the issuer sends the funds associated with the authorized transaction to the financial system 130 to be deposited in the account of the recipient 102.

Figure 2:
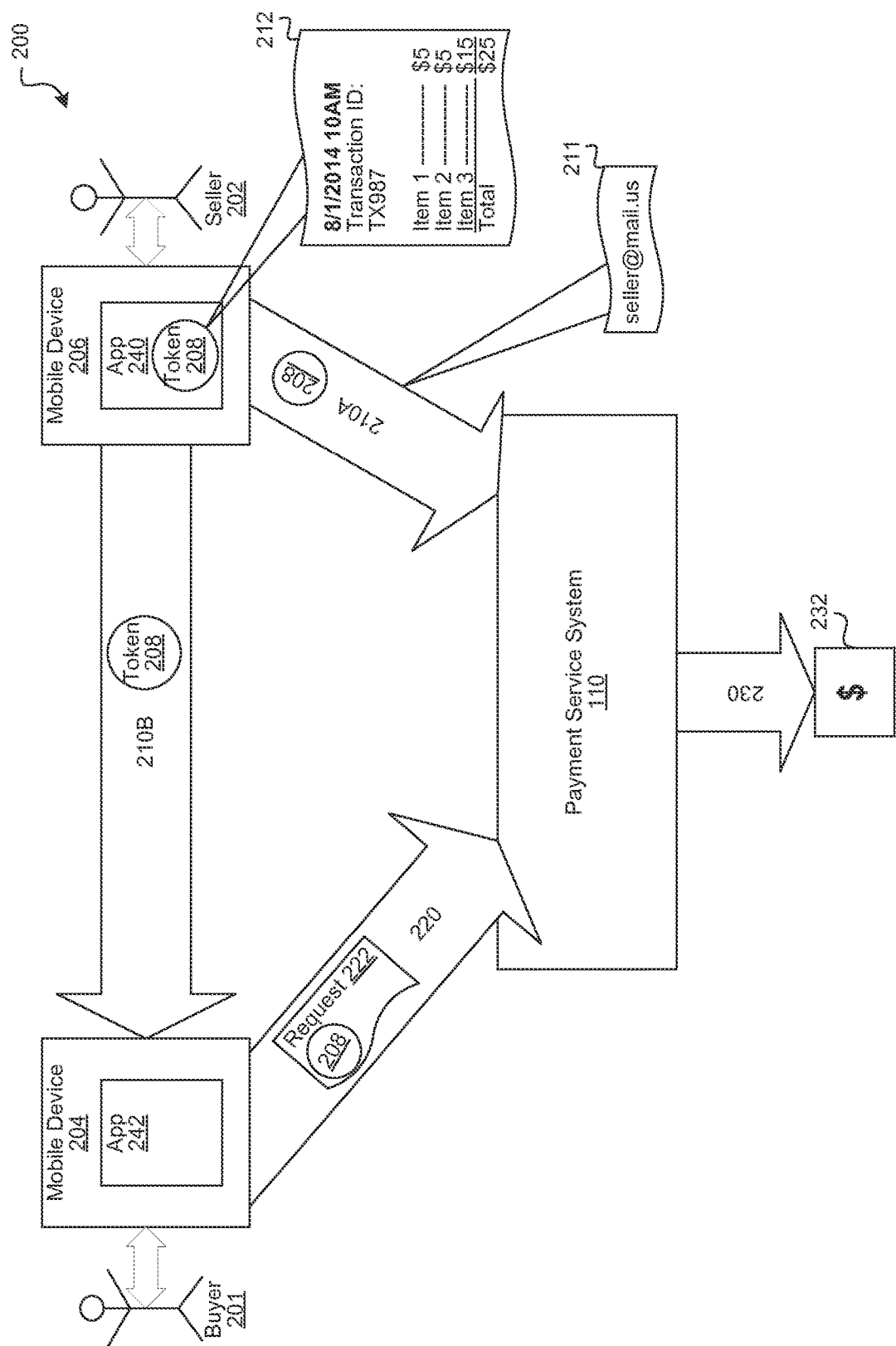
FIG. 2 illustrates an example payment transaction flow in accordance with a first embodiment of the disclosed technology.

FIG. 2 illustrates an example payment transaction flow 200 in accordance with a first embodiment of the disclosed technology. For ease of discussion of the payment transaction flow 200, consider an example scenario in which a seller 202 is an independent artist who wants to be paid for the sale of various paintings at an arts-and-crafts fair. The payment transaction flow 200 involves the transmission of a token 208 from the seller 202 to a buyer 204. In the payment transaction flow 200, the token 208 is an enriched token. As used here, an "enriched token" refers to a token embedded with a sufficient amount of information about a particular financial transaction that allows another user, in possession of such token, to carry out the particular financial transaction involving a payment transfer without having to provide any further information. That is, upon sending of the token 208 to the PSS 110, the PSS 110 has all the information it needs to execute the payment transfer, e.g., for the sale/purchase of the paintings. Note that this information embedded in the token does not include identification information of the payment recipient. For example, the information embedded in the token 208 is the transaction information for the paintings, e.g., the transaction date, the transaction ID, the description of the items, the itemized prices, and the total amount.

The payment transaction flow 200 begins when the seller 202 launches, or opens, a mobile payment application 240, installed on his mobile device 206, to start the process for a transfer of money, or a payment, for the paintings ("payment transfer"). The mobile payment application 240 is associated with the PSS 110. The mobile payment application 240 allows the seller 202 to generate the token 208 for use in the facilitation of the payment transfer. The token 208 enables the seller 202 to identify himself as the recipient of a particular payment amount, and enables any individual, such as a buyer 201, to send money to the identified recipient, so long as that individual possesses the token 208, without requiring the seller 202 to reveal his personal identity to the individual. Among other benefits, use of the token 208 enables the seller 202 to conceal his identification information from any individual in possession of the token 208, as the identification information is stored in association with the token 208 by the PSS 110, and such association is known only upon identification by the PSS 110. That is, while the token 208 may be transferrable and/or read by any computer system (e.g., the mobile device 204 of the buyer 201), the identification information associated with the token 208 is stored, and thereby concealed, by the PSS 110 from any computer system in possession of the token 208, enabling the seller 202 to remain anonymous. For example, where the token is a string of characters with the content "J111010101," only the PSS 110 is able to identify that the digits "J111010101" is associated, or linked, to the email address "JaneDoe@gmail.com" of Jane Doe (i.e., the identification information of the seller 202).

Referring back to the payment transaction flow 200, the seller 202 inputs, through the mobile payment application 240, various information to request for the token 208 (e.g., using a touch screen, keyboard, voice recognition, etc., of the mobile device 206). In the embodiment illustrated in FIG. 2, the various information includes personal information identifying the seller 202 ("identification information") and information about a particular transaction for which the seller 202 wishes to receive payment ("transaction information"). An example of the identification information that is submitted and associated with the token 208 is illustrated in a detailed example 211 of FIG. 2. An example of the transaction information that is submitted and embedded in the token 208 is illustrated in a detailed example 212 of FIG. 2.

The transaction information can include a merchant identification number or identifier ("merchant ID"), a timestamp indicating a transaction time and date, a transaction identifier ("transaction ID"), a transaction amount (e.g., price for purchase of two paintings), a description of transaction items (e.g., list of items and individual prices, total price, etc.), and the like. In some embodiments, the transaction information can be automatically received as part of a financial transaction (e.g., a purchase) executing on the mobile payment application 240 operating as a point-of-sale (POS) system for the seller 202, as opposed to being manually inputted by the seller 202. For example, the seller 202 "rings up" a purchase transaction using a POS interface executing on the mobile payment application 240, and selects "Get paid with token." In this example, the transaction information for the purchase is automatically extracted for use in the token generation process.

In some embodiments, the identification information can be any identifier that identifies the seller 202 including, for example, an email address, a telephone number, a driver's license number, a social security number, an employee identification number or identifier, a device identifier, an application identifier, an IP address, a personal identification number (PIN), a card verification value (CVV), a security access code, a biometric identifier (e.g., fingerprint, face, iris, retina, etc.), or any other identification means that function as a combination thereof. For example, where the identification information is an email address, the PSS 110 can use the email address to identify the seller 202 and a financial account associated with that email address.

In some embodiments, the identification information can include financial account information identifying the financial account of the seller 202. In such embodiments, the PSS 110, for example, can identify the financial account without requiring the PSS 110 to determine an association between the email address and the financial account information. In some embodiments, the identification information can include a billing address of the seller 202. In some embodiments, the identification information can include a mailing address of the seller 202.

Upon receiving from the seller 202 submission of all desired information, the mobile payment application 240 generates the token 208 with the transaction information embedded. The mobile payment application 240 then forwards the generated token along with the submitted identification information to the PSS 110, as indicated by step 210A. The PSS 110, in turn, associates the received token with the received identification information and stores the association, e.g., in a database (e.g., user account DB 604). For example, where the content of the token 208 is "12345," the PSS 110 associates the content of the token with "johnj@gmail.com" As will be explained in further details below, the PSS 110 can use this stored association to process a money transfer between the seller 202 and the buyer 201 when the PSS 110 receives the generated token 208 again from the buyer 201 at step 220.

In some embodiments, the generated token 208 is in the form of an encrypted message. In such embodiments, the mobile payment application 240 includes a token generator (not shown) that can generate the encrypted message. In some embodiments, the generated token 208 is in the form of a Quick Response Code ("QR Code"). In such embodiments, the mobile payment application 240 includes a token generator (not shown) capable of generating a QR Code. In some embodiments, the generated token 208 is in the form of a media file, such as an audio file, a video file, an image file. In such embodiments, the mobile payment application 240 includes a token generator (not shown) capable of generating the media file.

The payment transaction flow 200 continues at step 210B when the seller 202 provides the token 208 to the buyer 201. In some embodiments, the seller 202 can provide the token 208 through a communication broadcast (e.g., Wi-Fi®, Bluetooth®, Bluetooth® Low Energy, Near Field Communication (NFC), Apple® AirDrop®, etc.). For example, the seller 202 enables the AirDrop® feature on his iPhone® (e.g., mobile device 206) to transmit an image token to a nearby iPhone® (e.g., mobile device 204 of the buyer 201). In another example, the seller 202 broadcasts the token in the form of a QR Code by using Bluetooth® Low Energy to enable nearby mobile devices, such as the mobile device 204 of the buyer 201, to receive the QR Code.

In some embodiments, the seller 202 can provide the token 208 by physically showing it to the buyer 201. For example, the seller 202 prints out the QR code, which has been generated by the mobile payment application 240, and displays it in front of his merchandise for any interested buyer, such as the buyer 201, to scan, e.g., using a camera of the mobile device 204. In this example, the buyer 201 can scan the QR code when she is ready to make a purchase from the seller 202 (i.e., ready to tender him money for the merchandise).

In some embodiments, the buyer 201 can view the content of the token 208 through a mobile payment application 242 installed on the mobile device 204 of the buyer 201. In such embodiments, the mobile payment application 242 can be a different application or the same application utilized by the seller 202 (e.g., mobile payment application 240). The buyer 201 launches the mobile payment application 242, which extracts and displays for the buyer 201 the content of the token 208, which includes the transaction information. For example, the token 208 is an image token and the image, along with the transaction information, are displayed for the buyer 201 through the mobile payment application 242. In another example, the token 208 is a string of numbers, and the numbers "12345," along with the transaction information, are displayed for the buyer 201 through the mobile payment application 242. In both examples, the displayed content does not include any identification information of the seller 202, enabling the seller 202 to remain anonymous to the buyer 201. Only the PSS 110, which is able to identify the seller 202 based on a previously stored association between the token and the identification information of the seller 202.

In some embodiments, the mobile payment application 242 can display a transaction prompt to facilitate the sending of a request message 222 to the PSS 110, upon receipt of the token 208. For example, the mobile payment application 242 generates and displays a prompt to the buyer 101, "Do you agree to pay the merchant $15 for painting Al in this purchase transaction?" In step 220, upon receiving an approval to proceed from the buyer 201 (e.g., the buyer 201 clicks "Yes" in response to the prompt), the mobile payment application 242 transmits the request message 222 to the PSS 110, as indicated in step 220, to request that money be transferred to the recipient identified by the token 208.

In some embodiments, the buyer 201 transmits the request message 222 to the PSS 110, as indicated by step 220, by using an email mechanism. In such embodiments, the buyer 201 launches an email application (e.g., a native email application installed on the mobile device 204, a web-based email application, etc.) to compose an email to be sent to an email address associated with the PSS 110 ("PSS email address"). The buyer 201 can attach the token 208 in the body of the email. The buyer 201 can also include other information in the body or subject line of the email. For example, the buyer 201 inputs a payment amount in the subject line of the email to indicate how much money the buyer 201 wishes to send to the seller 202. In another example, the buyer 201 inputs the shipping address of the buyer 201. Other customized information can also be included in the email (e.g., special customer note, updated billing address, etc.). Note that in this example, the email itself includes the email address of the buyer 201 ("buyer email address"), which can serve as the identification information of the buyer 201 to be used in the processing of the payment transfer.

Figure 7:
FIG. 7 illustrates example database tables coupled to the payment service system in accordance with some embodiments of the disclosed technology.

Upon receiving the request message 222, the PSS 110 analyzes the included token 208 to determine the identity and associated financial account of the payment recipient (i.e., the seller 204). In particular, the PSS 110 analyzes the identification information stored in association with the token 208 to determine an identity of the recipient to whom money should be sent. The identification information can be, for example, an email address of the seller 202 ("seller email address"). In such example, the PSS 110 performs a database lookup to identify a match to the seller email address. If there is a match, the PSS 110 identifies any financial account that has been previously linked, or associated, with the seller email address, and utilizes the identified financial account in the execution, or the triggering of the execution of, the payment transfer. Example databases maintained by the PSS 110 to perform the lookup is shown as databases 702, 704 in FIG. 7.

Note, in some embodiments, the seller email address may be a payment service account with the PSS 110 created by the seller 202, who has provided to the PSS 110 the financial account information identifying the financial account when creating the payment service account. In such embodiments, the PSS 110 stores that financial account information in association with the email address. In some embodiments, the financial account information is provided to the mobile payment application 240 at the time the seller 202 requests for the token 208. In such embodiments, the financial account information is forwarded to the PSS 110 to store in association with the identification information of the seller 202, which is then stored in association with the token 208.

In some embodiments, the financial account information of the seller 202 is submitted after the buyer 201 sends a request 222 to the PSS 110. That is, the PSS 110 is unable to identify the financial account of the seller 202. For example, the financial account information is not stored previously by the PSS 110, is not provided along with the request for the token 208, is not an active account, or is otherwise not available, thereby preventing the PSS 110 to identify, access, and/or communicate with the financial account of the seller 202. In such embodiments, upon an unsuccessful attempt to identify the financial account of the seller 202, the PSS 110 sends a financial account request message to the seller 202 (e.g., through the mobile payment application 240, the seller email address, the seller telephone number, etc.). The financial account request message is configured to prompt the seller 202 to input financial account information associated with a particular financial account that the seller 202 desires to utilize for the money transfer.

Referring back to the payment process flow 200, the PSS 110 further analyzes other information associated with the request message 222 to determine the identity and financial account of the buyer 201 who has sent the request message 222. The information associated with the request message 222 can include the information submitted by the buyer 201 and/or inherent information that is included the request message 222. The inherent information can include, for example, identification information of the request message sender, i.e., the buyer 201, ("buyer identification information"), such as the email address of the buyer 201 from which the "request message" email has been sent ("buyer email address"). In an example, the PSS 110 performs a database lookup to identify a match to the buyer email address. If there is a match, the PSS 110 identifies any financial account that has been previously linked, or associated, with the buyer email address, and utilizes the identified financial account in the execution, or the triggering of the execution of, the payment transfer. Example databases maintained by the PSS 110 to perform the lookup is shown as databases 702, 704 in FIG. 7.

Note, in some embodiments, the buyer email address may be a payment service account with the PSS 110 created by the buyer 201, who has provided to the PSS 110 the financial account information identifying the financial account when creating the payment service account. In such embodiments, the PSS 110 stores that financial account information in association with the email address. In some embodiments, the financial account information is included in the request 222 sent to the PSS 110, e.g., through the mobile payment application 242. In such embodiments, the PSS 110 receives the financial account information and stores it in association with any identification information of the buyer 201 (e.g., email address). In some embodiments, the identification information of the buyer 201 includes the financial account information identifying the financial account of the buyer 201.

In some embodiments, the financial account information is submitted after the buyer 201 sends the request 222 to the PSS 110. That is, the PSS 110 is unable to identify the financial account of the buyer 201. For example, the financial account information is not stored previously by the PSS 110, is not provided in the request 222, is not an active account, or is otherwise not available, thereby preventing the PSS 110 to identify, access, and/or communicate with the financial account of the buyer 201. In such embodiments, upon an unsuccessful attempt to identify the financial account of the buyer 201, the PSS 110 sends a financial account request message to the buyer 201 (e.g., through the mobile payment application 242, the seller email address, the seller telephone number, etc.). The financial account request message is configured to prompt the buyer 201 to input financial account information associated with a particular financial account that the buyer 201 desires to utilize for the money transfer.

At step 230, upon successful identification of the respective financial accounts of the buyer 201 and the seller 202, the PSS 110 executes, or triggers execution of, the transfer of money 232 from the identified financial account of the buyer 201 to the identified financial account of the seller 202. In some embodiments, before the PSS 110 executes the transfer of money, the PSS 110 further analyzes the transaction information embedded in the token 208 to determine the payment amount to transfer. Once the PSS 110 successfully transfers the money (e.g., debits the bank account of the seller 202 with a payment amount from the bank account of the buyer 201), the PSS 110 sends a confirmation message to the seller 202. In some embodiments, the PSS 110 can also send a confirmation message to the buyer 201 to inform the buyer 201 that the payment amount has been transferred.

Once the seller 202 has received the confirmation message from the PSS 110, the seller 202 can then, for example, provide the two paintings to the buyer 201. In some embodiments, the seller 202 can also send a confirmation message to the PSS 110 to indicate that he has rendered the goods to the buyer 201. An example confirmation message can include a reference number that the PSS 110 can utilize to generate a receipt for the transaction, where the receipt can be utilized for a refund. For example, the PSS 110 generates a receipt for each of the buyer 201 and seller 202, where that receipt includes the reference number along with the transaction information extracted from the token 208. Further details regarding the receipt and the refund process will be discussed below in at least with reference to FIG. 4.

Note that in the above provided example, the payment transaction flow 200 discusses providing the token 208 to only one individual, the buyer 201, according to one embodiment of the disclosed technology. However, in other embodiments, the seller 202 can provide the same token 208 to multiple buyers to have money be transferred to him in multiple transactions (e.g., multiple sales of the same two painting replicas to different buyers). In such embodiments, the multiple buyers can each transfer money (i.e., a payment) to the seller 202 by including the token 208 in their respective payment transfer requests 222 to the PSS 110.

Figure 3:
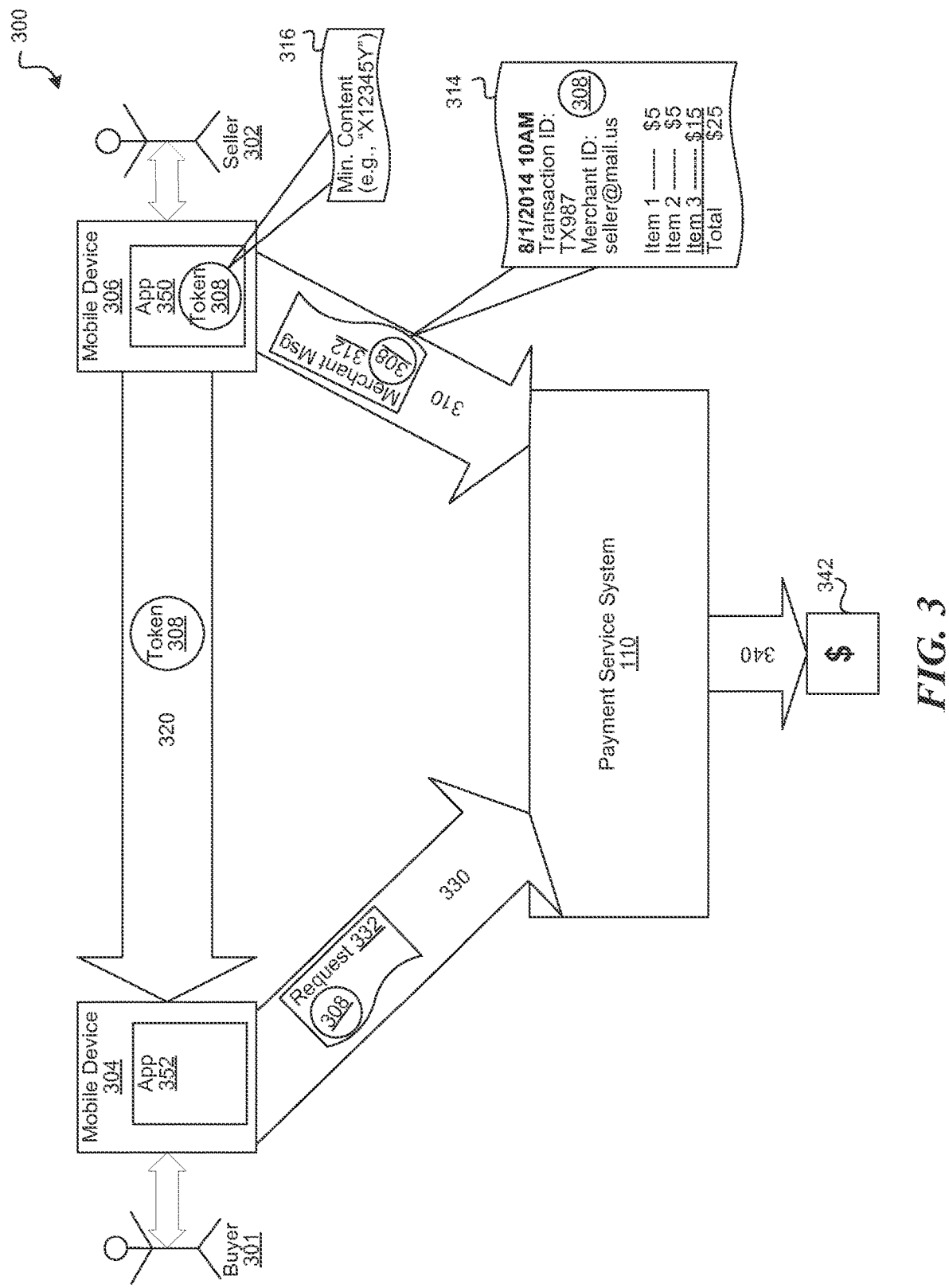
FIG. 3 illustrates an example payment transaction flow in accordance with a second embodiment of the disclosed technology.

FIG. 3 illustrates an example payment transaction flow 300 in accordance with a second embodiment of the disclosed technology. For the discussion in FIG. 3, consider a similar example discussed above with respect to FIG. 2, in which a seller 302 wants to be paid for the sale of various paintings from his design collection. In contrast to the example in FIG. 2, however, the payment transaction flow 300 of FIG. 3 involves the transmission of a token 308 from the seller 302 to both (a) a buyer 301 and (b) the PSS 110. In the payment transaction flow 300, the token 308 is a simplified token, in contrast to the enriched token 208 of FIG. 2. As used here, a "simplified token" refers to a token embedded with a minimum amount of information that simply enables anyone, in possession of the token, to start the process of payment transfer for any kind of financial transaction (e.g., a purchase transaction, an IOU debt transaction, etc.). That is, upon sending of the token 308 to the PSS 110, the PSS 110 needs more information about the transaction (e.g., transaction information such as the transaction ID, the transaction items being purchased, etc.) in order to execute the payment transfer. For example, the minimum amount of information can be a string of characters representative of the token 308. An example of the minimum amount of information, or content, of the token 308 is illustrated in a detailed example 316 of FIG. 3.

The payment transaction flow 300 begins when the seller 302 launches, or opens, a mobile payment application 350, installed on his mobile device 306, to initiate a transfer of money, or a payment, for the paintings ("payment transfer"). The mobile payment application 350 is associated with the PSS 110. The mobile payment application 350 allows the seller 302 to generate the token 308 for use in the facilitation of the payment transfer. The token 308 enables the seller 302 to identify himself as the recipient of a particular payment amount, and enables any individual, such as the buyer 301, to send money to the identified recipient, so long as that individual possesses the token 308, without requiring the seller 302 to reveal his personal identity to the individual. Among other benefits, use of the token 308 enables the seller 302 to conceal his identification information from any individual in possession of the token 308, as the identification information is stored in association with the token 308 by the PSS 110, and such association is known only upon identification by the PSS 110. That is, while the token 308 may be transferrable and/or read by any computer system (e.g., the mobile device 304 of the buyer 301), the identification information associated with the token 308 is stored, and thereby concealed, by the PSS 110 from any computer system in possession of the token 308, enabling the seller 302 to remain anonymous. For example, where the token is a string of characters with the content "987654," only the PSS 110 is able to identify that the digits "987654" is associated, or linked, to the telephone number "503-727-1000" of John Doe (i.e., the identification information of the seller 302).

Referring back to the payment transaction flow 300, the seller 302, inputs, through the mobile payment application 350, various information to request for the token 308 (e.g., by using a touch screen, keyboard, voice recognition, etc. of the mobile device 306). The various information can include personal information identifying the seller 302 ("identification information") and information about a particular transaction for which the seller 302 wishes to receive payment ("transaction information").

The transaction information can include a merchant identification number or identifier ("merchant ID"), a timestamp indicating a transaction time and/or date, a transaction identifier ("transaction ID"), a transaction amount (e.g., total price for purchase of two paintings), a description of transaction items (e.g., list of items and individual prices, total price, etc.), and/or the like. In some embodiments, the transaction information can be automatically received as part of a financial transaction (e.g., a purchase) executing on the mobile payment application 350 operating as a point-of-sale (POS) system for the seller 302, as opposed to being manually inputted by the seller 302. For example, the seller 302 "rings up" a purchase transaction using a POS interface executing on the mobile payment application 350, and selects "Get paid with token." In this example, the transaction information for the purchase is automatically extracted for use in the token generation process.

In some embodiments, the identification information can be any identifier that identifies the seller 302, including, for example, an email address, a telephone number, a driver's license number, a social security number, an employee identification number or identifier (ID), a device identifier, an application identifier, an IP address, a personal identification number (PIN), a card verification value (CVV), a security access code, a biometric identifier (e.g., fingerprint, face, iris, retina, etc.), or any other identification means that function as a combination thereof. In the embodiment of FIG. 3, the seller 302 submits his email address ("seller email address") as the identifier. For example, where the identification information is an email address, the PSS 110 can use the email address to identify the seller 302 and a financial account associated with that email address.

In some embodiments, the identification information inputted by the seller 302 can include financial account information identifying the financial account of the seller 302. In such embodiments, the PSS 110, for example, can identify the financial account without requiring the PSS 110 to determine an association between the email address and the financial account information. In some embodiments, the identification information can include a billing address of the seller 302. In some embodiments, the identification information can include a mailing address of the seller 302.

Upon receiving the identification information and the transaction information from the seller 302, the mobile payment application 350 generates the token 308. Note, in contrast to the payment transaction flow 200, the payment transaction flow 300 does not involve embedding the generated token 308 with any additional information, such as the transaction information.

In some embodiments, the token 308 is in the form of an encrypted message. In such embodiments, the mobile payment application 350 includes a token generator (not shown) that can generate the encrypted message. In some embodiments, the token 308 is in the form of a Quick Response Code ("QR Code"). In such embodiments, the mobile payment application 350 includes a token generator (not shown) that can generate a QR Code®. In some embodiments, the token 308 is in the form of a media file, such as an audio file, a video file, an image file. In such embodiments, the mobile payment application 350 includes a token generator (not shown) that can generate the media file.

The payment transaction flow 300 continues at steps 310 and 320 when the seller 302 provides the token 308 to the PSS 110 and to the buyer 301, respectively. In particular, at step 310, the seller 302 transmits a merchant message 312 to the PSS 110. The merchant message 312 includes the generated token 308 (e.g., a copy of the token 308), the identification information of the seller 302, and the transaction information. An example merchant message 314 with the identification information (e.g., "MerchantID: seller @mail.us") and the transaction information is illustrated in FIG. 3.

In some embodiments, the seller 302 transmits the merchant message 312 to the PSS 110 by use of an email mechanism. In such embodiments, the seller 302 launches an email application (e.g., a native email application installed on the mobile device 204, a web-based email application, etc.) to compose an email to be sent to an email address associated with the PSS 110 ("PSS email address"). The seller 302 can include the token 308 as an attachment to the email and input the transaction information and the identification information in the body and/or the subject line of the email.

In some embodiments, the seller 302 transmits the merchant message 312 to the PSS 110 through the mobile payment application 350 installed on the mobile device 306. In such embodiments, the seller 302 launches the mobile payment application 350 to submit the merchant message 312 to the PSS 110. The seller 302 can submit, to the mobile payment application 350, the token 308, the identification information, and the transaction information to be included in the merchant message 222. Upon receiving from the seller 302 submission of all desired information, the mobile payment application 350 transmits the merchant message 312 to the PSS 110.

The PSS 110 receives the merchant message 312 and stores the information, e.g., in a database. In particular, the PSS 110 associates the token 308 with the received identification information, and stores such association, e.g., in a database (e.g., user account DB 604). For example, where the content of the token 208 is "12345," the PSS 110 associates the content of the token with the email address "john@gmail.com." The PSS 110 further associates the token 308 with the transaction information received in the merchant message 312, and stores such association. As will be explained in further details below, the PSS 110 can use the stored associations to process a money transfer between the seller 302 and the buyer 301 when the PSS 110 receives the generated token 308 again from the buyer 301 at step 330.

The payment transaction flow 300 continues at step 320, where the seller 302 also provides the token 308 to the buyer 301. In some embodiments, the seller 302 can provide the token 308 through a communication broadcast (e.g., Wi-Fi®, Bluetooth®, Bluetooth® Low Energy, Near Field Communication (NFC), Apple® AirDrop®, etc.). For example, the seller 302 enables the AirDrop® feature on his iPhone® (e.g., mobile device 306) to transmit an image token to a nearby iPhone® (e.g., mobile device 304 of the buyer 301). In another example, the seller 302 broadcasts the token in the form of an encrypted message by using Bluetooth® Low Energy to enable nearby mobile devices, such as the mobile device 304 of the buyer 301, to receive the encrypted message.

In some embodiments, the seller 302 can provide the token 308 by physically showing it to the buyer 301. For example, the seller 302 prints out a QR code token, which has been generated by the mobile payment application 350, and displays it in front of his merchandise for any interested buyer, such as the buyer 301, to scan, e.g., by using a camera of the mobile device 304. In this example, the buyer 301 can scan the QR code when she is ready to make a purchase from the seller 302 (i.e., ready to tender him money for the merchandise).

In some embodiments, the buyer 301 can receive the token 308 and view the content of the token 308 through a mobile payment application 352 installed on the mobile device 304 of the buyer 301. In such embodiments, the mobile payment application 352 can be a different application or the same application utilized by the seller 302 (e.g., mobile payment application 350). The buyer 301 launches the mobile payment application 352, which extracts and displays for the buyer 301 the content of the token 308. For example, the token 308 is an image token and the image is displayed for the buyer 301 through the mobile payment application 352. In this example, the displayed content does not include any identification information of the seller 302, as the identification information has been sent only to the PSS 110 for storage, enabling the seller 302 to remain anonymous to the buyer 301.

At step 330, the buyer 301 transmits a request message 332, which includes the token 308, to the payment service system 110 ("PSS 110") to request that a payment be made (i.e., money to be transferred) to a recipient identified by the token 308. In some embodiments, the request message 332 also includes a payment amount specified by the buyer 301. For example, the payment amount is the transaction amount for the purchase of three paintings from the seller 302. In some embodiments, the request message 332 include identification information associated with the buyer 301. For example, the identification information includes an email address of the buyer 301. In another example, the identification information includes financial account information identifying a financial account of the buyer 301. In yet another example, the identification information includes a telephone number of the buyer 301.

In some embodiments, the buyer 301 transmits the request message 332 to the PSS through the mobile payment application 352 installed on the mobile device 304. In such embodiments, the mobile payment application 352 generates and displays a transaction prompt to facilitate the sending of the request message 332. For example, the transaction prompt displays the message, "Would you like to pay the identified merchant?" In such example, upon receiving an approval to proceed from the buyer 301 (e.g., the buyer 301 clicks "Yes" and enters an amount in response to the prompt), the mobile payment application 352 transmits the request message 332 to the PSS 110, as indicated by step 330.

In some embodiments, the buyer 301 transmits the request message 332 to the PSS 110, as indicated by step 330, by using an email mechanism. In such embodiments, the buyer 301 launches an email application (e.g., a native email application installed on the mobile device 304, a web-based email application, etc.) to compose an email to be sent to an email address associated with the PSS 110 ("PSS email address"). The buyer 301 can attach the token 308 in the body of the email. The buyer 301 can also include other information in the body or subject line of the email. For example, the buyer 301 inputs a payment amount in the subject line of the email to indicate how much money the buyer 301 wishes to send to the seller 302. In another example, the buyer 301 inputs the shipping address of the buyer 301. Other customized information can also be included in the email (e.g., special customer note, updated billing address, etc.). Note that in this example, the email itself includes the email address of the buyer 301 ("buyer email address"), which can serve as the identification information of the buyer 301 to be used in processing of the payment transfer. Note that in other embodiments, other mechanisms may be used by the buyer 301 to transfer the request message 332 to the PSS 110. For example, the buyer 301 can send an SMS message or a message using a web interface of a website hosted by the PSS 110.

Upon receiving the request message 332 from the buyer 301, the PSS analyzes the included token 308 and compares it to the token received in the merchant message 312 sent from the seller 302. In response to identifying a match between the tokens, the PSS identifies the identification information associated with the seller 302 based on the previously stored association between the token 308 and the identification information. The PSS can further utilize the identification information to identify a financial account of the seller 302. For example, the seller 302 has provided, in the past, to the PSS financial account information identifying a financial account of the seller 302, which the PSS 110 has stored in association with the identification information. The PSS 110 can utilize the identified financial account to execute the payment transfer. Example databases maintained by the PSS 110 to perform the lookup of the token and the identification information is shown as databases 702, 704 in FIG. 7.

The PSS can further analyze the merchant message 312 to identify the transaction information included in the merchant message 312. In some embodiments, the PSS 110 determines an amount that should be transferred based on a matching of transaction amount specified by the transaction information included in the merchant message 312 and the transaction amount specified by the buyer 301 in the request message 332.

The PSS 110 further analyzes other information associated with the request message 332 to determine the identity and financial account of the buyer 301. The information associated with the request message 332 can include the information submitted by the buyer 301 and/or inherent information that is included in the request message 332. The inherent information can include, for example, identification information of the request message sender, i.e., the buyer 301, ("buyer identification information"), such as the email address of the buyer 301 from which the "request message" email has been sent ("buyer email address"). In an example, the PSS 110 performs a database lookup to identify a match to the buyer email address. If there is a match, the PSS 110 identifies any financial account that has been previously linked, or associated, with the buyer email address, and utilizes the identified financial account in the execution, or the triggering of the execution of, the payment transfer. Example databases maintained by the PSS 110 to perform the lookup is shown as databases 702, 704 in FIG. 7.

Note, in some embodiments, the buyer email address may be a payment service account with the PSS 110 created by the buyer 301, who has provided to the PSS 110 the financial account information identifying the financial account when creating the payment service account. In such embodiments, the PSS 110 stores that financial account information in association with the email address. In some embodiments, the financial account information is included in the request 332 sent to the PSS 110, e.g., through the mobile payment application 352. In such embodiments, the PSS 110 receives the financial account information and stores it in association with any identification information of the buyer 301 (e.g., email address). In some embodiments, the identification information of the buyer 301 includes the financial account information identifying the financial account of the buyer 301.

In some embodiments, the financial account information is submitted after the buyer 301 sends the request 332 to the PSS 110. That is, the PSS 110 is unable to identify the financial account of the buyer 201. For example, the financial account information is not stored previously by the PSS 110, is not provided in the request 332, is not an active account, or is otherwise unavailable, thereby preventing the PSS 110 to identify, access, and/or communicate with the financial account of the buyer 301. In such embodiments, upon an unsuccessful attempt to identify the financial account of the buyer 301, the PSS 110 sends a financial account request message to the buyer 301 (e.g., through the mobile payment application 352, the seller email address, the seller telephone number, etc.). The financial account request message is configured to prompt the buyer 301 to input financial account information associated with a particular financial account that the buyer 301 desires to utilize for the money transfer.

At step 340, upon successful identification of the respective financial accounts of the buyer 301 and the seller 302, the PSS 110 executes or triggers execution of the transfer of money 342. In some embodiments, before the PSS 110 executes the transfer of money, the PSS 110 further analyzes the transaction information included in the merchant message 312 to determine the payment amount to transfer. In some embodiments, prior to executing the transfer of money 342, the PSS 110 also performs an additional step to verify whether the financial account of the buyer 301 has sufficient funds to satisfy the payment amount requested. Further details regarding the verification step will be discussed in FIG. 5 below.

Once the PSS 110 successfully transfers the money (e.g., debits the bank account of the seller 302 with a payment amount from the bank account of the buyer 301), the PSS 110 sends a confirmation message to the seller 302. In some embodiments, the PSS 110 can also send a confirmation message to the buyer 301 to inform the buyer 301 that the payment amount has been transferred.

Once the seller 302 has received the confirmation message from the PSS 110, the seller 302 can then, for example, provide the two paintings to the buyer 301. In some embodiments, the seller 302 can also send a confirmation message to the PSS 110 to indicate that he has rendered the goods to the buyer 301. An example confirmation message can include a reference number that the PSS 110 can utilize to generate a receipt for the transaction, where the receipt can be utilized for a refund. For example, the PSS 110 generates a receipt for each of the buyer 301 and seller 302, where that receipt includes the reference number along with the transaction information extracted from the merchant message 312. Further details regarding the receipt and the refund process will be discussed below in at least with reference to FIG. 4.

Note that in the above provided example, the payment transaction flow 300 discusses providing the token 308 to the PSS 110 and to only one individual money sender (i.e., the buyer 302), in accordance with one embodiment of the disclosed technology. However, in other embodiments, the seller 302 can provide the same token 308 to multiple money senders (e.g., two or more buyers). In such embodiments, the multiple money senders each transfers money (i.e., a payment) to the seller 302 by including the token 308 in their respective payment transfer requests to the PSS 110. Further, the seller 302, at the same time, can send multiple, different merchant messages corresponding to each of the buyers. The seller 302 can include different transaction information in each merchant message to correspond to a particular transaction associated with a particular buyer, while attaching the same 308 token in the merchant message. For example, the seller 302 sends a first merchant message 312A to include transaction details for only 1 item to be sold to a buyer 301A, and a second merchant message 312B to include details for 3 items sold to a buyer 301B.

In reference to FIGS. 2 and 3, the examples provided above, according to some embodiments, require that the buyer 201, 301 and the seller 202, 302 must each have a user account with the payment service system 110 ("payment service account") before the transaction to transfer the payment can be performed. In some embodiments, only the seller 202, 302 is required to have a payment service account, and a payment service account is automatically created for the buyer 201, 301 upon the buyer 201, 301 sending the request message 222, 332 to the PSS 110.

A user, such as the buyer 201, 301, can sign up using the mobile payment application 242, 352 or another mobile application, or using an online website to communicate with the PSS 110. The user can use the mobile device or another computing device, e.g., a home computer, to sign up. At some point prior to the transaction, a mobile application is downloaded to the mobile device, e.g., through an application store. Creation of the payment service account can be handled through the mobile application, or through another application, e.g., a generic web browser, communicating with the PSS 110. The user enters a name, account password, and identification information, e.g., an email address where the user can be contacted, a social security number, a personal pin number, etc.

Additionally, before any payment transaction can be performed, the user also enters financial account information sufficient to conduct the transaction into the PSS 110. For example, in the case of a credit card account, the user can enter the credit card issuer, credit card number and expiration date into the PSS 110; the card validation value and mailing address may also be required. However, the financial account could also be associated with a debit card or pre-paid card, or another third party financial account. The data associated with a payment service account can be stored, e.g., in a database of the PSS 110.

In some embodiments, if the user is a merchant, such as the seller 202, 302, the user can also provide other information, e.g., a list of goods or services available, operating hours, phone number, a small identifying image logo or mark, to the payment service system 110. The data associated with such user can be stored, e.g., in a database of the PSS 110.

Note that each of the tokens 208, 308 generated in the payment transaction flows 200, 300 can include other information not discussed in the examples above, as long as that information does not include identification information of the seller 202, 302.

Figure 4:
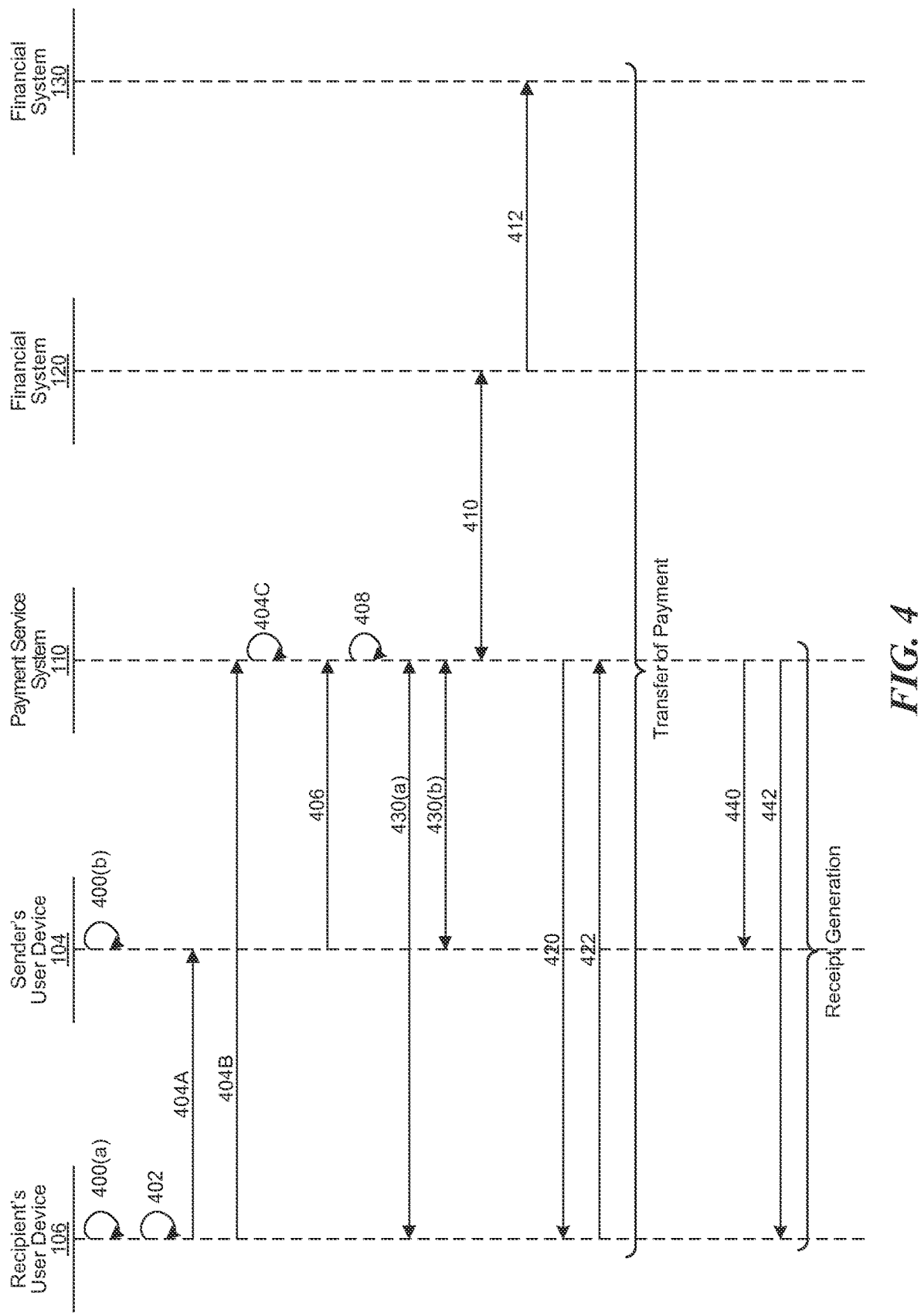
FIG. 4 is a sequence diagram illustrating a process for an anonymous transfer of payment by use of an enriched token in accordance with the first embodiment of the disclosed technology.

FIG. 4 is a sequence diagram illustrating a process for an anonymous transfer of payment between a sender and a recipient by use of an enriched token. For purposes of illustration only, the process of FIG. 4 is explained with reference to certain elements illustrated in FIG. 1. The process of FIG. 4 involves the recipient 102 initiating a transfer of money to be sent to him from the sender 101 by use of an enriched token.

In some embodiments, before the transfer of money can take place, the recipient 102 is required to have a user account with the payment service system 110 ("payment service account"). The recipient 102 can sign up for a payment service account at step 400A, or another time before money actually gets transferred to a financial account of the recipient 102 (e.g., at step 430(*a*)). In particular, creation of the payment service account can be handled through a mobile application, or through another application, e.g., a generic web browser, capable of communicating with the PSS 110. Through the application, the recipient 102 enters a name, account password, and identification information, e.g., an email address where the user can be contacted, a social security number, a personal pin number, etc. In some embodiments, the recipient 102 also enters financial account information sufficient to conduct any payment transaction to be saved in database of the PSS 110. For example, in the case of a credit card account, the recipient 102 can enter the credit card issuer, credit card number and expiration date into the PSS 110; the card validation value and mailing address may also be required. However, the financial account could also be associated with a debit card or pre-paid card, or another third party financial account such as a bank. In some embodiments, the recipient 102 can also provide other information, e.g., a list of goods or services available, operating hours, phone number, a small identifying image logo or mark, to the payment service system 110. In such embodiments, provision of the other information to the PSS 110 is beneficial if the recipient 102 utilizes the payment service account as a merchant account to conduct sales.

At step 402, the recipient 102 launches, or opens, a mobile payment application installed on his mobile device 106 to initiate the transfer of a payment, or money. The mobile payment application is associated with the PSS 110, and can communicate with the PSS 110 in facilitating the payment transfer (e.g., transmit, receive, and execute instructions of the PSS 110). The mobile payment application can be the same application used to create the payment service account as described in the embodiment above.

The mobile payment application allows the recipient 102 to generate a token that contains embedded information for use in the facilitation of the payment transfer. The embedded information, according to the embodiment of FIG. 4, includes transaction information related to the transaction between the sender 101 and the recipient 102.

At step 402, the recipient 102 submits, through the mobile payment application, the transaction information in addition to identification information associated with the recipient 102. The identification information can be, for example, an email address of the recipient ("recipient email address"). In some embodiments, the identification information is automatically detected, or determined, by the mobile payment application if the recipient 102 is logged into his payment service account 110. For example, the username for the payment service account, which is the recipient email address, is automatically detected by the mobile payment application. The transaction information can include, for example, a timestamp indicating a transaction time and date, a transaction amount (e.g., amount of "IOU" debt owed by the sender 101 to the recipient 102), a description of transaction items (e.g., IOU for pizza and beverages in social outing), and the like.

Upon receiving all of the information, the mobile payment application generates for the recipient 102 the token embedded with the transaction information. In some embodiments, the token is in the form of an encrypted message. In some embodiments, the token is in the form of a Quick Response Code ("QR Code"). In some embodiments, the token is in the form of a media file, such as an audio file, a video file, an image file.

At step 404A, the recipient 102 provides the token to the sender 102. In the embodiment of FIG. 4, the recipient 102 provides the token by transmitting the token to the user device 104 of the sender 102. The token transmission can be carried out through a communication broadcast (e.g., Wi-Fi®, Bluetooth®, Bluetooth® Low Energy (BLE), Near Field Communication (NFC), Apple® AirDrop®, etc.). For example, the user device 106, through the mobile payment application, generates a QR code and transmits it to the user device 104 over BLE.

At step 404B, the recipient 102 provides the token (e.g. a copy of the same token provided to the sender 101), in addition to the identification information of the recipient 102, to the PSS 110. The PSS 110 stores the token in association with the identification information of the recipient 102 for use in identifying the recipient associated with the token in future transactions, as indicated by step 404C.

At step 406, the sender 101, having received the token from the recipient 102, transmits a request message, which includes the token, to the payment service system 110 (PSS 110) to request that a payment be made (i.e., money to be transferred) to a recipient identified by the token. In some embodiments, the request message also includes a payment amount specified by the sender 101. For example, the payment amount is the amount owed by the sender 101 to the recipient 102.

In some embodiments, the sender 101 transmits the request message through a mobile payment application installed on the user device 104. In such embodiments, the sender 101 can view the content of the token through the mobile payment application. In particular, the mobile payment application installed on the user device 104 can extract and display for the sender 101 the transaction information embedded in the enriched token. The mobile payment application is associated with the PSS 110, and can communicate with the PSS 110 in facilitating the payment transfer (e.g., transmit, receive, and execute instructions of the PSS 110). The mobile payment application can be a different application or the same application utilized by the recipient 102 at step 402 to generate the token.

In some embodiments, the sender 101 transmits the request message to the PSS 110 through an email mechanism. In such embodiments, the sender 101 launches an email application (e.g., a native email application installed on the mobile device 104, a web-based email application, etc.) to compose an email to be sent to an email address associated with the PSS 110 ("PSS email address"). The sender 101 can include the token as an attachment to the email. The sender 101 can also include other information in the body or subject line of the email. For example, the sender 101 inputs a payment amount in the subject line of the email to indicate how much money the sender 101 wishes to send to the recipient 102. In another example, the sender 101 inputs a personalized note to the recipient 102. Note that in this example, use of the email enables the PSS 110 to use the email address of the sender 101 as identification information to identify the sender 101 and to process the payment transfer.

At step 408, upon receiving the request message, the PSS 110 analyzes the token to determine (a) the identity and associated financial account of the payment recipient (i.e., the recipient 102), (b) the identity and associated financial account of the payment sender (i.e., the sender 101), and (c) the transaction information for which the payment is to be transferred. For example, the PSS 110 performs a database lookup to identify a matching token and identification information that is stored in association with the token. The PSS 110, in this example, utilizes that identification information (e.g., the recipient email address) to identify a financial account that has been previously linked, or associated, with the recipient email address, and utilizes the identified financial account in the execution, or the triggering of the execution of, the payment transfer. For example, the recipient email address is the same email address used to create the payment service account with the PSS 110 in step 400A. As such, the PSS 110 can correlate that recipient email address to identify a financial account linked to the payment service account.

In some embodiments, if the PSS 110 is unable to identify the financial account of the recipient 102 based on the identification information stored in association with the token, the PSS 110 transmits a message to the recipient 102 (e.g., through the mobile payment application) to obtain information for the missing financial account. For example, the recipient 102 did not link a financial account when signing up for the payment service account in step 400A. In another example, the recipient 102 did not sign up for a payment service account at all.

In such embodiments where there is no financial account identified, the PSS 110 transmits, to the mobile device 106, a push notification prompting the recipient 102 to link a payment card (e.g., a debit card or a credit card) to the identification information (e.g., email address) of the recipient 102, as indicated in step 430(a). In response to the push notification, the recipient 102 can submit, through the mobile payment application, payment card information (e.g., card number, expiration date, CVV, etc.) of a particular payment card that identifies a financial account of the seller 202.

Upon receiving submission of the payment card information, the PSS 110 can proceed with executing or triggering execution of the transfer of money. In some embodiments, the PSS 110 stores the newly submitted payment card information in association with the identification information, thereby linking the payment card to the recipient 102. In some embodiments, the PSS 110 creates a payment service account for the recipient 102 when it stores an association between the identification information and the financial account of the recipient 102. That is, the PSS 110 performs step 400A at this point in the process of FIG. 4.

At step 408, the PSS 110 further analyzes other information included in the request message to determine the identity and financial account of the sender 101 who has sent the request message. The information included in the request message can include the information submitted by the sender 101 and/or inherent information that is part of the request message (e.g., metadata). The inherent information can include identification information of the request message sender. The identification information can be, for example, the email address from which the email has been sent, such as the email address of the sender 101 ("sender email address"), the device ID from which the email has been sent (e.g., ID of the mobile device 104), the IP address from which the email has been sent, or any other information identifying the request message sender.

The PSS 110 performs a database lookup to identify a match to the identification information of the sender 101, e.g., the sender email address. If there is a match, the PSS 110 identifies any financial account that has been previously linked, or associated, with, e.g., the sender email address, and utilizes the identified financial account in the execution, or the triggering of the execution of, the payment transfer.

In some embodiments, if the PSS 110 is unable to identify the financial account of the sender 101, the PSS 110 transmits a message to the sender 101 to obtain information for the missing financial account. In one example, the PSS 110 transmits to the user device 104 (e.g., through the mobile payment application) a push notification prompting the sender 101 to link a payment card (e.g., a debit card or a credit card), as indicated in step 430(b). In response to the push notification, the sender 101 submits payment card information (e.g., card number, expiration date, CVV, etc.) of a particular payment card that identifies a financial account of the sender 101.

Upon receiving submission of the payment card information, the PSS 110 can proceed with executing or triggering execution of the transfer of money. In some embodiments, the PSS 110 stores the newly submitted payment card information in association with the identification information, thereby linking the payment card to the sender 101 for processing of future transactions. In some embodiments, the PSS 110 creates a payment service account for the sender 101 when it stores an association between the identification information and the financial account of the sender 101. That is, the PSS 110 performs step 400B at this point in the process of FIG. 4.

At step 410, upon successful identification of the respective financial accounts, the PSS 110 executes or triggers execution of the transfer of money from the identified financial account of the sender 101 to the identified financial account of the recipient 102. In some embodiments, the PSS 110 simply communicates with the financial system 120, which has been identified as the account of the sender 101 at step 408, to cause the payment amount to be transferred to the financial system 130. In such embodiments, the financial system 120, in response, transfers funds to the financial system 130 of the recipient 102, as indicated in step 412.

In some embodiments, the PSS 110 performs, at step 410, an additional action to verify and confirm that the financial account 110 has sufficient funds to satisfy the payment amount requested to be transferred. In such embodiments, the PSS 110 communicates with the financial system 120 the payment amount and waits for a verification message from the financial system 120 that the amount has been credited from the account of the sender 101 to the account of the recipient 102 (i.e., facilitated by the financial system 130). In response to the verification message, the PSS 110 transmits a message to the user device 106 of the recipient 102 indicating that money has been transferred. The recipient 102, can then, for example, render goods or services to the sender 101. In some embodiments, the recipient 102 can transmit a message to the PSS 110 indicating that the goods or services (or any other obligation owed to the sender 101 in exchange for the money transferred) has been completed, as indicated by step 422. The payment transfer process can end at step 422.

In some embodiments, the PSS 110 generates and transfers a receipt (e.g., a confirmation receipt) to both the recipient 102 and the sender 101, as indicated by steps 440 and 442. In some embodiments, the generation and transfer of the receipt can be triggered by the message received from the recipient indicating the transaction (e.g., rendering of goods by the recipient 102 to the sender 101) has been completed. In some embodiments, the generation and transfer of the receipt can be triggered by a successful transfer of the payment amount from a financial account of the sender 101 to the recipient 102.

In some embodiments, the PSS 110, in generating the receipt, also generates a second token (not shown) associated with the sender 101 (i.e., a "sender anonymizing token"). In such embodiments, the PSS 110 associates the second token with all information relevant to the transfer of money, and stores such association in a database of the PSS 110. In some embodiments, the information can include the identification information associated with the recipient 102 and the sender 101, respectively. In some embodiments, the information can include the transaction information, such as a transaction identifier (ID) that identifies the transaction between the sender 101 and the recipient 102, a transaction date, a list of transaction items, the transaction amount, and/or the like. The second token serves to protect the personal identification information of the sender 101 from being known by the recipient 102, and vice versa, as only the PSS 110 has knowledge of the association between the second token and the identification information. The second token can be included in the receipt and transmitted to each of the recipient 102 and the sender 101.

Figure 5:
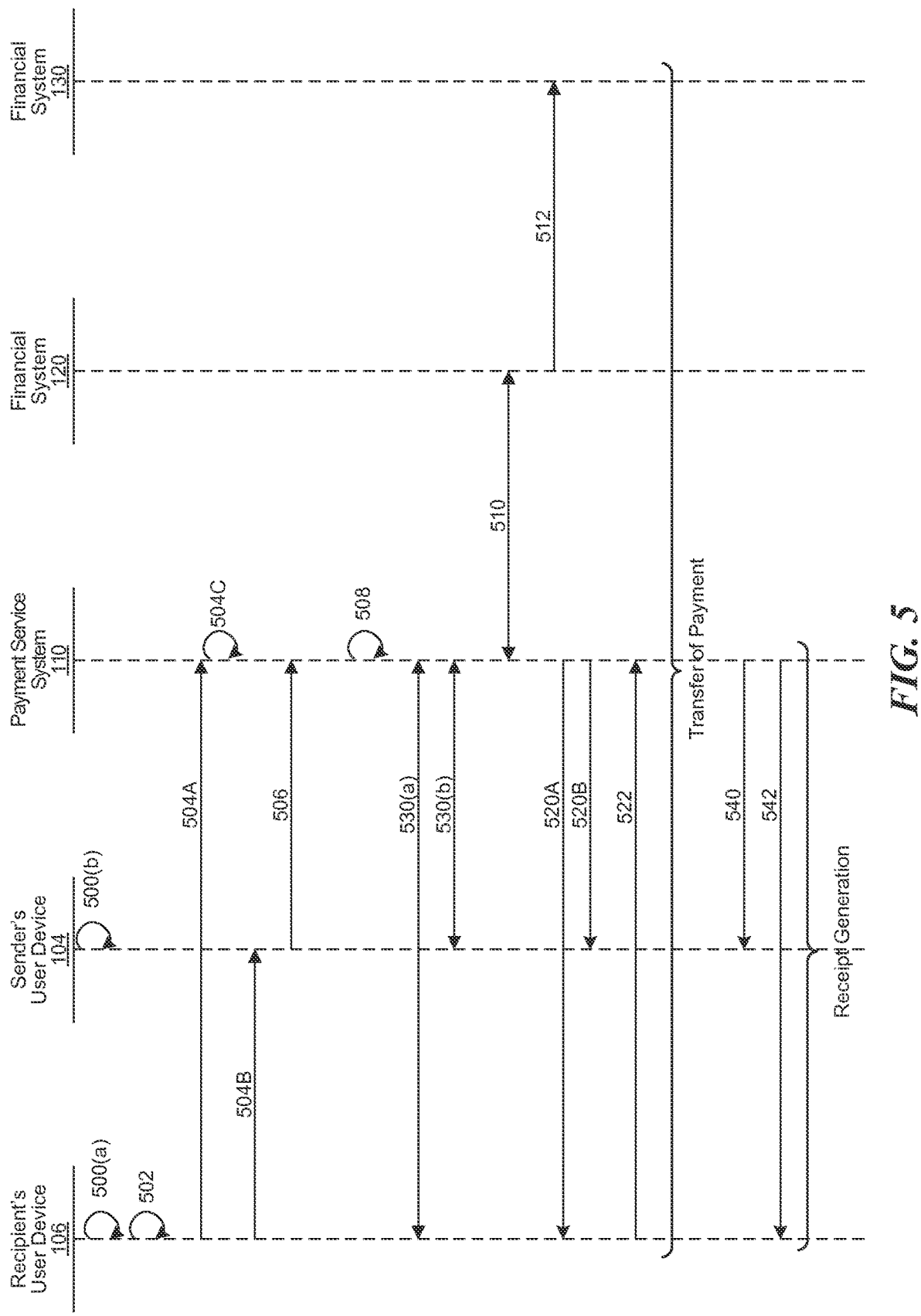
FIG. 5 is a sequence diagram illustrating a process for an anonymous transfer of payment by use of a simplified token in accordance with the second embodiment of the disclosed technology.

FIG. 5 is a sequence diagram illustrating a process for an anonymous transfer of payment between a sender and a recipient by use of a simplified token. For purposes of illustration only, the process of FIG. 5 is explained with reference to certain elements illustrated in FIG. 1. The process of FIG. 5 involves the recipient 102 initiating a transfer of money to be sent to him from the sender 101.

In some embodiments, before the transfer of money can take place, the recipient 102 is required to have a user account with the payment service system 110 ("payment service account"). The recipient 102 can sign up for a payment service account at step 500A, or another time before money actually gets transferred to a financial account of the recipient 102 (e.g., at step 530(a)). In particular, creation of the payment service account can be handled through a mobile application, or through another application, e.g., a generic web browser, capable of communicating with the PSS 110. Through the application, the recipient 102 enters a name, account password, and identification information, e.g., an email address where the user can be contacted, a social security number, a personal pin number, etc. In some embodiments, the recipient 102 also enters financial account information sufficient to conduct any payment transaction to be saved in database of the PSS 110. For example, in the case of a credit card account, the recipient 102 can enter the credit card issuer, credit card number and expiration date into the PSS 110; the card validation value and mailing address may also be required. However, the financial account could also be associated with a debit card or pre-paid card, or another third party financial account such as a bank. In some embodiments, the recipient 102 can also provide other information, e.g., a list of goods or services available, operating hours, phone number, a small identifying image logo or mark, to the payment service system 110. In such embodiments, provision of the other information to the PSS 110 is beneficial if the recipient 102 utilizes the payment service account as a merchant account to conduct sales.

At step 502, the recipient 102 launches, or opens, a mobile payment application installed on his mobile device 106 to initiate the transfer of a payment, or money. The mobile payment application is associated with the PSS 110, and can communicate with the PSS 110 in facilitating the payment transfer (e.g., transmit, receive, and execute instructions of the PSS 110). The mobile payment application can be the same application used to create the payment service account as described in the embodiment above.

The mobile payment application allows the recipient 102 to generate a token for use in the facilitation of the payment transfer. In contrast to the token generated in the embodiment of FIG. 4, the token generated in the embodiment of FIG. 5 is a simplified token with no additional information embedded (e.g., no embedded transaction information). For example, the simplified token simply contains the image that is indicative of the token.

At step 502, the recipient 102, through the mobile payment application, submits identification information and transaction information (e.g., by using a touch screen, keyboard, voice recognition, etc.) in a request for the token. The identification information can be any identifier that identifies the recipient 102, including, for example, an email address, a telephone number, a driver's license number, a social security number, an employee identification number (ID), a device identifier, an application identifier, an IP address, a personal identification number (PIN), a card verification value (CVV), a security access code, a biometric identifier (e.g., fingerprint, face, iris, retina, etc.), or any other identification means that function as a combination thereof. In the embodiment of FIG. 5, the recipient 102 submits his email address ("recipient email address") as the identifier.

Upon receiving the submission from the recipient 102, the mobile payment application generates the token. In some embodiments, the token is in the form of an encrypted message. In some embodiments, the token 308 is in the form of a Quick Response Code ("QR Code"). In some embodiments, the token 308 is in the form of a media file, such as an audio file, a video file, an image file.

At step 504B, the recipient 102 provides the token to the sender 101. In some embodiments, the recipient 102 can provide the token through a communication broadcast (e.g., Wi-Fi®, Bluetooth®, Bluetooth® Low Energy, Near Field Communication (NFC), Apple® AirDrop®, etc.). For example, the recipient 101 enables the AirDrop® feature on his iPhone® (e.g., device 106) to transmit an image token to a nearby iPhone® (e.g., device 104 of the sender 101). In another example, the recipient 102 broadcasts the token in the form of an encrypted message by using Bluetooth® Low Energy to enable nearby mobile devices, such as the device 104, to receive the encrypted message.

In some embodiments, the recipient 102 can provide the token by physically showing it to the sender 101. For example, the recipient 102 prints out a QR code token, which has been generated by the mobile payment application, and displays it in front of his merchandise for any interested buyer, such as the sender 101, to scan, e.g., by using a camera of the user device 104. In this example, the sender 101 can scan the QR code when she is ready to make a purchase from the recipient 102 (i.e., ready to tender him money for the merchandise).

At step 504A, the recipient 102 provides the generated token, along with the submitted transaction information and the identification information, to the PSS 110, e.g., by sending a message from the user device 106 to the PSS 110. In some embodiments, the recipient 102 transmits the message to the PSS 110 by use of an email mechanism. In such embodiments, the recipient 102 launches an email application (e.g., a native email application installed on the user device 104, a web-based email application, etc.) to compose an email to be sent to an email address associated with the PSS 110 ("PSS email address"). The recipient 102 can include the token as an attachment to the email. The recipient 102 can also include the transaction information and the identification information in the body or subject line of the email.

In some embodiments, the recipient 102 transmits the message to the PSS 110 through the mobile payment application installed on the user device 106. In such embodiments, the recipient 102 launches the mobile payment application to submit the token, the identification information, and the transaction information to be included in the message. Upon receiving submission of all desired information from the recipient 102, the mobile payment application then transmits the message to the PSS 110.

At step 504C, the PSS 110 receives the message sent from the recipient 102, where the message includes the token, the identification information, and the transaction information. In particular, the PSS 110 stores the token in association with the identification information of the recipient 102 for use in future transactions, e.g., in step 510. The PSS 110 also stores the transaction information. In some embodiments, the transaction information is stored in association with the token. In some embodiments, the transaction information is stored in association with the identification information.

At step 506, the sender 101, having received the token from the recipient 102, transmits a request message, which includes the token, to the payment service system 110 ("PSS 110") to request that a payment be made (i.e., money to be transferred) to a recipient identified by the token. In some embodiments, the request message also includes a payment amount specified by the sender 101. For example, the payment amount is the transaction amount for the purchase of three paintings from the recipient 102.

In some embodiments, the sender 101 transmits the request message to the PSS 110 through a mobile payment application installed on the mobile device 104. The mobile payment application can be a different application or the same application utilized by the recipient 102 to generate the token in step 502. In some embodiments, the mobile payment application displays the general content of the token (e.g., the string of characters "X1234" indicative of the token) along with a transaction prompt to facilitate the sending of a request message to the PSS 110. For example, the transaction prompt displays the message, "Would you like to pay the identified merchant?" In such example, upon receiving an approval to proceed from the sender 101 (e.g., the sender 101 clicks "Yes" and enters an amount in response to the prompt), the mobile payment application transmits the request message to the PSS 110, as indicated in step 506.

At step 508, upon receiving the request message from the sender 101, the PSS 110 analyzes the included token and compares it to the token received in the message sent from the recipient 101 (at step 504A). In response to identifying a match between the tokens, the PSS 110 identifies the identification information stored in association with the token to determine an identity of the recipient 102. Further, the PSS 110 identifies the transaction information associated with the token. In some embodiments, the PSS 110 compares the transaction information included in the message sent at step 504A (from the recipient 102) with the transaction information included in the message sent at step 506 (from the sender 101) to process the payment transfer. For example, the PSS 110 determines the amount that should be transferred to be the matching amount between the messages received at steps 504A, 506. As already discussed in the process of FIG. 4, the PSS 110, in the process of FIG. 5, similarly determines the identity and associated financial account of the payment recipient (i.e., the recipient 102) based on the previously stored association between the token and the identification information of the recipient 102.

The PSS 110 further analyzes other information associated with the request message to determine the identity and financial account of the sender 101. The information associated with the request message can include the information submitted by the sender 101 and/or inherent information that is part of the request message. The inherent information can include, for example, identification information of the request message sender (e.g., the sender 101). The identification information can be, for example, the email address from which the "request message" email has been sent, such as the email address of the sender 101 ("sender email address"). The PSS 110 identifies the financial account of the sender 101 based on the identification information.

At step 510, upon successful identification of the respective financial accounts, the PSS 110 executes or triggers execution of the transfer of money from the identified financial account of the sender 101 to the identified financial account of the recipient 102. In some embodiments, the PSS 110 communicates with the financial system 120, which has been identified as the account of the sender 101 at step 510, to cause the payment amount to be transferred to the financial system 130. In such embodiments, the financial system 120, in response, transfers funds to the financial system 130 of the recipient 102, as indicated in step 514.

In some embodiments, the PSS 110 performs, at step 510, an additional action to verify and confirm that the financial account 110 has sufficient funds to satisfy the payment amount requested to be transferred. In such embodiments, the PSS 110 communicates with the financial system 120 the payment amount and waits for a verification message from the financial system 120 that the amount has been credited from the account of the sender 101 to the account of the recipient 102 (i.e., facilitated by the financial system 130.

In response to the verification message, the PSS 110 transmits a message to the user device 106 of the recipient 102 indicating that money has been transferred, as indicated by step 520A. In some embodiments, the PSS 110 can also send the message to the user device 104 of the sender 102 indicating that money has been transferred, as indicated by step 520B. The recipient 102, can then, for example, render goods or services to the sender 101. In some embodiments, the recipient 102 can transmit a message to the PSS 110 indicating that the goods or services has been completed, as indicated by step 522. The payment transfer process can end at step 522.

In some embodiments, the PSS 110 generates and transfers a receipt (e.g. a confirmation receipt) to both the recipient 102 and the sender 101, as indicated by steps 540 and 542. In some embodiments, the generation and transfer of the receipt can be triggered by the message received from the recipient 102 to indicate that the transaction (e.g., rendering of goods by the recipient 102 to the sender 101) has been completed. In some embodiments, the generation and transfer of the receipt can be triggered by a successful transfer of the payment amount from a financial account of the sender 101 to the recipient 102.

In some embodiments, the PSS 110, in generating the receipt, also generates a second token (not shown) associated with the sender 101 (i.e., a "sender anonymizing token"). In such embodiments, the PSS 110 associates the second token with the identification information of the sender 101, and stores such association in a database of the PSS 110. In some embodiments, the PSS 110 can also generate a second token that is associated with all information relevant to the transfer of money, and stores such association in a database of the PSS 110 ("transaction anonymizing token"). The information can include the identification information associated with the sender 101 and the transaction information associated with the transaction between the sender 101 and the recipient 102 (e.g., a transaction identifier (ID) that identifies the transaction between the sender 101 and the recipient 102, a transaction date, a list of transaction items, the transaction amount, and/or the like).

In some embodiments, the transaction information can be embedded in the second token, as opposed to being stored in association with the second token, to enable any individual in possession of the token to view details about the transaction. In such embodiments, no identification information is embedded in the token. For example, the identification information of the seller 101 is only associated with the second token and stored by the PSS 110.

Among other benefits, use of the second token serves to protect the personal identification information of the sender 101 from being known by the recipient 102, as only the PSS 110 has knowledge of the association between the second token and the identification information. The second token can be included in the receipt and transmitted to each of the recipient 102 and the sender 101. For example, if either the sender 101 or the recipient 102 decides to return goods associated with the transaction, the sender 101 or the recipient 102 can provide the receipt with the second token to enable a payment transfer for the refund ("refund payment transfer") to the sender 101.

In some embodiments, the sender 101, as opposed to the recipient 102, can utilize a mobile payment application installed on the user device 104 to generate a simplified token in the form of a one-time use token for use with the recipient 102. In some embodiments, the mobile payment application is associated with the PSS 110 (e.g., works in coordination with the PSS 110). In some embodiments, the mobile payment application receives instructions from the PSS 110 for executing various processes. In some embodiments, the mobile payment application is a different application as the one used to generate the token for the recipient 102.

As used here, the term "one-time use token" refers to a simplified token that operates as a "cash" payment card that carries a limited amount of cash, or funds, available for use. In some embodiments, the one-time use token can be configured to operate only within a specified time period. In such embodiments, the limited amount of funds would be ineffective upon expiration of the specified time period. For example, the one-time use token carries an amount of $50 that must be used within 30 min. of creation, or generation, of the token (e.g., by the mobile payment application).

In accordance with the embodiments, the sender 101 can provide the one-time use token to the recipient 102 as a payment mechanism, e.g., in exchange for goods. For example, the one-time use token is a QR code. In this example, the recipient 102 can scan the QR code provided by the sender 101 to "charge" the sender 101 for a transaction amount, and the transaction amount is deducted from the amount carried by the one-time use token. With such implementation, the recipient 102 would never learn of the real identity (and/or personal identification information) of the sender 101, while still being able to receive payment from the sender 101 for the transaction.

In accordance with the embodiments, the sender 101 first submits identification information to the mobile payment application to generate the onetime use token. In some embodiments, the sender 101 can also submit financial account information associated with a financial account of the sender 101 (e.g., credit card information associated with a credit card, debit card information associated with a debit card, etc.), and a token amount for the one-time use token. In such embodiments, the mobile payment application communicates the identification information, the financial account information, and the token amount to the PSS 110, which creates a "one-time use token" account for the sender 101. The one-time use token can then be provided to the recipient 102 to utilize as payment. Upon a reading of the one-time use token by an application installed on a device of, or associated with, the recipient 102, the application sends an indication to the PSS 110 that a "charge" amount has been initiated on the one-time use token. The PSS 110 identifies the one-time use token account and deducts the charge amount from the financial account of the sender 101.

In various embodiments, the token information receiver 612, the token generator 614, the request analyzer 622, the financial account manager 624, and the payment executor 626 can handle the steps for implementing the one-time use token process. For example, the token information receiver 612 and the token generator 614 can work in coordination to generate the one-time use token for the sender 101. Further, in this example, the request analyzer 622, the financial account manager 624, and the payment executor 626 can receive the one-time use token from the recipient 102 to analyze content of the token, identify the financial account of the sender 101, and execute or cause the execution of a payment transfer from the financial account of the sender 101 to a financial account of the recipient 102.

Figure 6:
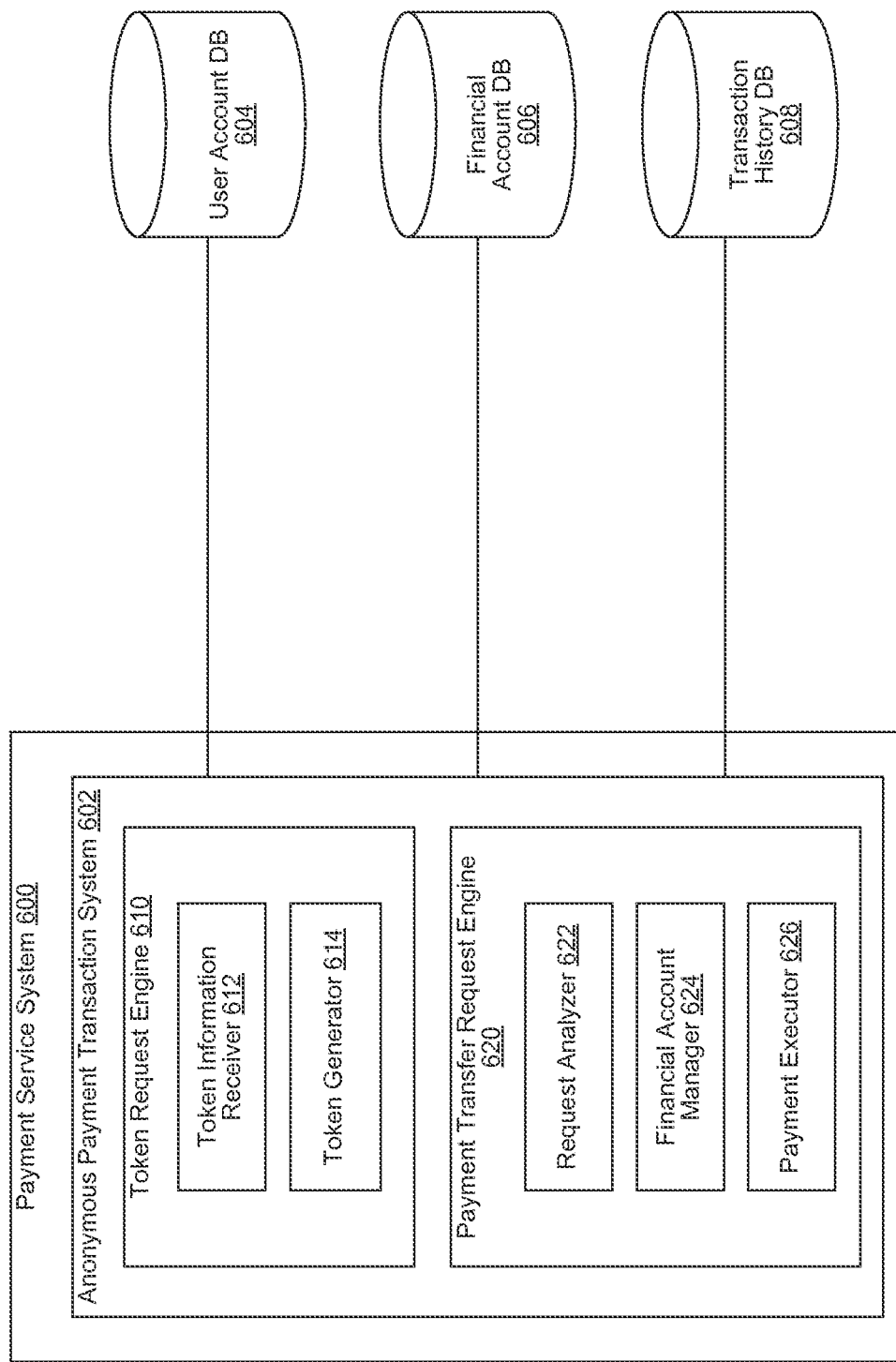
FIG. 6 is block diagram illustrating various components of an intermediary payment service system in accordance with some embodiments of the disclosed technology.

FIG. 6 is block diagram illustrating various components of an intermediary payment service system 600 ("PSS 600") in accordance with some embodiments of the disclosed technology. In one embodiment, the PSS 600 can be the PSS 110 of FIG. 1. The PSS 600 includes an anonymous payment transaction system 602 and databases 604, 606, 608. The payment transaction system 602 includes a token request engine 610 and a payment transfer request engine 620. In implementing the disclosed technology, the token request engine 610 can include, for example, a token information receiver 612 and a token generator 614. Additionally, in implementing the disclosed technology, the payment transfer request engine 620 can include, for example, a request analyzer 622, a financial account manager 624, and a payment executor 626.

The databases 604, 606, 608 can be used for storing information for executing applications that facilitate money transfer transactions (e.g., mobile payment applications 240, 242, 350, 352). For example, the user account database 604 ("DB 604") can store user account information of one or more users of a payment service executed by the PSS 600. The account information can include, for example, a user identifier (e.g., name, email address, phone number, device identifier, mobile application identifier, username), account password, user preferences, billing address, shipping address, and/or the like. An example database table maintained by the DB 604 is shown as the database 702 of FIG. 7.

The financial account database 606 ("DB 606"), for example, can store information related to the financial accounts associated with payment cards of the one or more users of the payment service. The financial account information, or payment card information, can include, for example, a user identifier (e.g., name, email address, phone number, device identifier, mobile application identifier, username), payment card/account number (e.g., primary account number or PAN), expiration date, card/account type, CVV code, billing address, and/or the like. An example database table maintained by the DB 606 is shown as the database 704 of FIG. 7.

The transaction history database 608 ("DB 608"), for example, can store information related to financial transactions, such as a transfer of money between users of the payment service operated by the PSS 600. The information related to the financial transactions can include, for example, a transaction ID, a merchant ID or an identifier of a payee ("payee ID"), a customer ID or an identifier of a payer ("payer ID"), a transaction amount (e.g., total price, individual prices, tax, etc.), a transaction date, a transaction description (e.g., product or service item names or codes), and/or the like.

Each of the databases 604, 606, 608 discussed above can include, for example, one or more hard drives, a centralized or distributed data cluster, a cloud-storage service provider, or other suitable storage systems suitable for storing digital data. Additionally, various other databases other than those discussed above can also be accessed by the PSS 600.

The token request engine 610 can process requests from one or more users for tokens, for example, as described in FIGS. 2-5. The token information receiver 612, of the engine 610, can detect or receive one or more selections or inputs from a user through a user device (e.g., device 106, FIG. 1) (e.g., via an input device coupled to the device 106, such as a mouse, a keyboard, a touchscreen, an actuatable button, a gesture capturing device, a microphone, or the like). Through the selections or inputs, the user can specify or provide the type of token the user would like to be generated (e.g., simplified token, enriched token, QR token, string-of-character token, encrypted message token, an image token), the number of tokens desired, the information that the user wants to be embedded in the token (e.g., transaction information, personalized/customized message, etc.), and the identification information of the user to be associated with the generated token. For example, the user can select one of several existing sets of identification information, or alternatively input an email address, to be used as the identification information for association with the token. In another example, the user can input details about a transaction in which she wishes to receive money (i.e., transaction information). In yet another example, the user can select one of several existing accounts, or input payment card/account information identifying a particular account, that the user wishes to receive money for the payment transfer.

The token request engine 610 is coupled to the token generator 614 in communicating the information specified in the token request from the user. The token generator 614 generates the token based on the token request (e.g., request for a simplified token or an enriched token, request for a particular type of token, request for a particular number of tokens, etc.) and transmits that token back to the user device in response to the token request. For example, the token generator 614 generates four QR codes indicative of four enriched tokens, and transmits those QR codes to the user, e.g., via email, text message, or a mobile payment application. The token request engine 610 also works in coordination with the databases 604, 606, and 608 to store the generated tokens in association with the identification information provided by the user. In some embodiments, the token request engine 610 also stores the transaction information (and any other information) provided by the user in association with the token and/or the identification information.

The payment transfer request engine 620 can process requests from one or more users (i.e., senders of money) to transfer money using a token, for example, as described in FIGS. 2-5. The token can be generated, for example, by the token generator 614 as discussed above. The request analyzer 622, of the payment transfer request engine 620, can receive a request from a sender for the money transfer through a user device (e.g., user device 104, FIG. 1). The request analyzer 622 can then parse the money transfer request to extract details, such as the content of the token (e.g., a string of numbers "1234898" representative of the token), including any embedded information of the token (e.g., transaction information).

The request analyzer 622 can communicate with the financial account manager 624 to determine whether a recipient identifier is associated with one or more payment cards/financial accounts. For example, the financial account manager 624 can utilize the recipient identifier extracted by the request analyzer 622 to compare it with a recipient identifier stored in the user account DB 604, and access the financial account DB 606 to identify a financial account that is stored in association with that identifier. In some embodiments, where no financial account is identified, the financial account manager 624 notifies the request analyzer 622, which communicates with another user device (e.g., device 106) to request financial account information from the recipient. This may be done, for example, by sending an email to the recipient using the recipient identifier. In another example, this may be done by sending a push notification to the recipient using the recipient identifier. Upon receiving the financial account information for a financial account/payment card from the recipient, the request analyzer 622 communicates that information to the financial account manager 624 for storage in the DB 606.

In some embodiments, the request analyzer 622 further communicates with the financial account manager 624 to determine whether the sender's identifier (i.e., payer identifier) is associated with one or more payment cards/financial accounts. Similarly, where no financial account is identified, the financial account manager 624 notifies the request analyzer 622 of the missing account information. In response, the request analyzer 622 communicates with the sender's user device (e.g., device 104) to request financial account information from the sender. This can be done, for example, by sending an email to the sender using the sender's identifier. In another example, this can be done by sending back a push notification to the user device. Upon receiving the financial account information for a financial account/payment card from the sender, the request analyzer 622 communicates that information to the financial account manager 624 for storage in the DB 606.

The payment executor 626 is in communication with the request analyzer 622 and the financial account manager 624 to execute or trigger execution of the transfer of an amount associated with the money transfer request, as described in FIGS. 2-5. In particular, the payment executor 626, upon receiving confirmation of identified financial accounts for the recipient and the sender, causes the money to be transferred from a financial account associated with the sender (e.g., a bank account funding the sender's payment card) to another financial account associated with the recipient (e.g., a bank account associated with the recipient's payment card).

Figure 8:
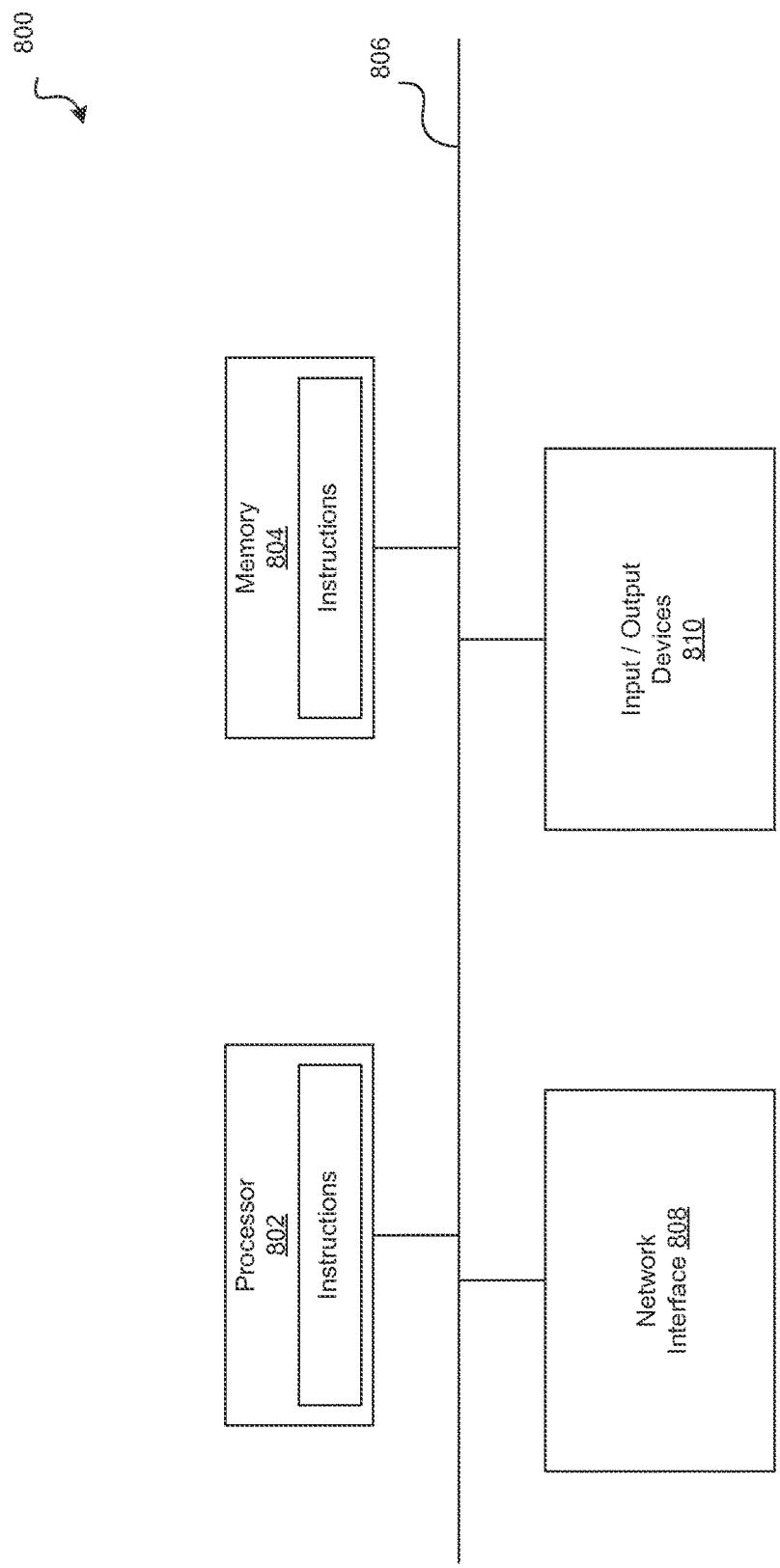
FIG. 8 is a high-level block diagram illustrating an example of a computer system that can represent any of the devices described above for use in implementing various embodiments of the disclosed technology.

FIG. 8 is a high-level block diagram illustrating an example of a computer system that can represent any of the devices described above, such as the user devices 104, 106, the PSS 110, and the financial systems 120, 130. In alternative embodiments, the computer system operates as a standalone device or can be connected (e.g., networked) to other computer systems. In a networked deployment, the computer system can operate in the capacity of a server or a client computer in a client-server network environment, or as a peer computer in a peer-to-peer (or distributed) network environment.

The computer system can be a server computer, a client computer, a personal computer (PC), a mobile electronic user device, a tablet PC, a laptop computer, a set-top box (STB), a personal digital assistant (PDA), a cellular telephone or a smart phone (e.g., an iPhone or an Android phone), a web-enabled household appliance, a network router, switch or bridge, a (hand-held) gaming device, a music player, or any computer capable of executing a set of instructions (sequential or otherwise) that specify actions to be taken by that computer.

In the illustrated embodiment, the computer system 800 includes one or more processors 802, one or more memories 804, a network interface device 808, and one or more input/output devices (I/O) devices 810, all coupled to each other through an interconnect 806. The interconnect 806 can be or include one or more conductive traces, buses, point-to-point connections, controllers, adapters and/or other conventional connection devices.

The processor(s) 802 can be or include, for example, one or more general purpose programmable microprocessors, microcontrollers, application specific integrated circuits (ASICs), programmable gate arrays, or the like, or a combination of such devices. The processor(s) 802 control the overall operation of the processing device 800.

The one or more memor(ies) 804 can be or include one or more physical storage devices, which can be in the form of random access memory (RAM), read-only memory (ROM) (which can be erasable and programmable), flash memory, miniature hard disk drive, or other suitable type of storage device, or a combination of such devices. The one or more memor(ies) 804 can store data and instructions that configure the processor(s) 801 to execute operations in accordance with the techniques described above.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the computer and that cause the computer to perform any one or more of the methodologies of the presently disclosed technique and innovation.

In general, the routines executed to implement the embodiments of the disclosed technology, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of computer-readable storage media, computer-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device 808 enables the computer to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device 808 can include a firewall which can, in some embodiments, govern and/or manage permission to access/proxy data in a computer network, and track varying levels of trust between different computers and/or applications. The firewall can be any number of modules having any combination of hardware and/or software components able to enforce a predetermined set of access rights between a particular set of computers and applications, computers and machines, and/or applications and applications, for example, to regulate the flow of traffic and resource sharing between these varying entities. The firewall can additionally manage and/or have access to an access control list which details permissions including for example, the access and operation rights of an object by an individual, a computer, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

While some aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects can likewise be embodied as a means-plus-function claim, or in other forms, such as being embodied in a computer-readable medium. Accordingly, the applicant reserves the right to add additional claims after filing the application to pursue such additional claim forms for other aspects of the disclosure.

The invention claimed is:

1. A method comprising:

receiving, by an intermediary payment service system for anonymously transferring money through an exchange of information between a device of a recipient of a payment and a device of a sender of the payment and from a first payment application associated with the intermediary payment service system and executing on the device of the recipient of the payment, a request from the recipient of the payment to generate a recipient-anonymizing token, the request from the recipient of the payment including recipient identification information and transaction information associated with a transaction;

identifying, by the intermediary payment service system and in a data store maintained by the intermediary payment service system, account information of the recipient using the recipient identification information received from the device of the recipient of the payment;

generating, by the intermediary payment service system and based on the identified account information and the transaction information received from the device of the recipient of the payment, the recipient-anonymizing token corresponding to the recipient of the payment, wherein generating the recipient-anonymizing token through the intermediary payment service system necessitates the sender of the payment to communicate through the intermediary payment service system for the transfer of the payment to the recipient such that sender identification information is concealed from the recipient of the payment and recipient identification information is concealed from the sender of the payment and the sender and recipient remain anonymous during the transfer of the payment;

storing, by the intermediary payment service system and in the data store maintained by the intermediary payment service system, an association between the account information of the recipient of the payment and the recipient-anonymizing token;

providing, by the intermediary payment service system, for display of the recipient-anonymizing token within the first payment application executing on the device of the recipient, wherein the recipient-anonymizing token is presented in a format that anonymously embeds the recipient identification information and the account information of the recipient such that the recipient identification information and the account information of the recipient remain unknown to the sender of the payment; and based at least in part on receiving, by the intermediary payment service system and from the device of the sender of the payment, an indication of an intent to transfer the payment via a second payment application executing on the device of the sender of the payment:

comparing, by the intermediary payment service system, a received token associated with the indication of the intent to transfer the payment to the recipient-anonymizing token stored in the data store maintained by the intermediary payment service system, wherein the received token is generated through interaction with the recipient-anonymizing token;

responsive to a determination of a correspondence between the received token and the recipient-anonymizing token, identifying, by the intermediary payment service system, a recipient account associated with the recipient based on the previously stored association between the account information of the recipient and the recipient-anonymizing token in the data store of the intermediary payment service system; and facilitating, by the intermediary payment service system, the transfer of the payment corresponding to a transaction amount to the recipient account.

2. The method of claim 1, further comprising:
identifying, by the intermediary payment service system and in the data store maintained by the intermediary payment service system, a sender account associated with the sender, wherein the intermediary payment service system facilitates the transfer of the payment from the identified sender account to the recipient account.

3. The method of claim 2, wherein the sender account and the recipient account are each any of a bank account, a pre-paid account, or a credit card account.

4. The method of claim 1, further comprising:
determining, by the intermediary payment service system, that no sender account associated with the sender is stored in the data store maintained by the intermediary payment service system;

transmitting, by the intermediary payment service system, a payment account request to the second payment application executing on the device of the sender, the payment account request configured to prompt the sender to input payment account information associated with the sender account; and in response to receiving the payment account information, facilitating the transfer of the payment from the sender account to the recipient account.

5. The method of claim 1, wherein the recipient-anonymizing token corresponding to the recipient of the payment is presented in a machine-readable format.

6. The method of claim 1, wherein the recipient-anonymizing token corresponding to the recipient of the payment is presented as any of a matrix barcode, a media file, a string of characters, an encrypted message, or a globally unique identifier.

7. The method of claim 1, wherein the indication of the intent to transfer the payment is received by the intermediary payment service system from the second payment application executing on the device of the sender subsequent to the second payment application having been used to scan the recipient-anonymizing token displayed within the first payment application executing on the device of the recipient of the payment.

8. The method of claim 1, wherein the indication of the intent to transfer the payment is received by the intermediary payment service system from the second payment application executing on the device of the sender after the first payment application executing on the device of the recipient of the payment has transferred the recipient-anonymizing token to the second payment application executing on the device of the sender of the payment through a short-range communication broadcast.

9. The method of claim 1, wherein the indication of intent to transfer the payment includes the recipient-anonymizing token, the transaction amount, and sender identification information associated with the sender.

10. The method of claim 1, further comprising, prior to facilitating the transfer of the payment corresponding to the transaction amount to the recipient account:
transmitting, by the intermediary payment service system, a transaction confirmation request message to the device of the sender, wherein the transaction confirmation request message is configured to prompt the sender to approve the transaction amount to be transferred to the recipient.

11. The method of claim 1, wherein generating, based on the identified account information and the transaction information received from the device of the recipient of the payment, the recipient-anonymizing token corresponding to the recipient of the payment comprises:
causing the first payment application executing on the device of the recipient to generate the recipient-anonymizing token; and
causing the first payment application executing on the device of the recipient to transmit the recipient-anonymizing token to the intermediary payment service system.

12. The method of claim 1, further comprising, based at least in part on receiving an indication of a second intent to transfer payment via a third payment application executing on a second device of a second sender:
- identifying, by the intermediary payment service system, the recipient account associated with the recipient, wherein the recipient account is identified based on an identification of the previously stored association between the recipient-anonymizing token and the account information of the recipient in the data store of the intermediary payment service system; and
- automatically facilitating, by the intermediary payment service system, a second transfer of the payment corresponding to the transaction amount to the recipient account.

13. The method of claim 12, further comprising:
- identifying, by the intermediary payment service system and in the data store maintained by the intermediary payment service system, a second sender account associated with the second sender, wherein the intermediary payment service system facilitates the second transfer of the payment from the identified second sender account to the recipient account.

14. The method of claim 1, wherein:
- the indication of the intent to transfer payment is received by the intermediary payment service system from the second payment application executing on the device of the sender after the first payment application executing on the device of the recipient of the payment has transferred the recipient-anonymizing token to the second payment application executing on the device of the sender of the payment through a short-range communication broadcast; and
- the short-range communication broadcast for sending the recipient-anonymizing token from the first payment application to the second payment application comprises one or more of a Wi-Fi, a Bluetooth, a Bluetooth Low Energy, or a near field communication.

15. An intermediary payment service system comprising: one or more processors; and one or more computer-readable non-transitory storage media in communication with the one or more processors and comprising instructions that, when executed by the one or more processors, are configured to cause the intermediary payment service system to perform operations comprising:
- receiving, by the intermediary payment service system for anonymously transferring money through an exchange of information between a device of a recipient of a payment and a device of a sender of the payment and from a first payment application associated with the intermediary payment service system and executing on the device of the recipient of the payment, a request from the recipient of the payment to generate a recipient-anonymizing token, the request from the recipient of the payment including recipient identification information and transaction information associated with a transaction;
- identifying, by the intermediary payment service system and in a data store maintained by the intermediary payment service system, account information of the recipient using the recipient identification information received from the device of the recipient of the payment;
- generating, by the intermediary payment service system and based on the identified account information and the transaction information received from the device of the recipient of the payment, the recipient-anonymizing token corresponding to the recipient of the payment, wherein generating the recipient-anonymizing token through the intermediary payment service system necessitates the sender of the payment to communicate through the intermediary payment service system for the transfer of the payment to the recipient such that sender identification information is concealed from the recipient of the payment and recipient identification information is concealed from the sender of the payment and the sender and recipient remain anonymous during the transfer of the payment;
- storing, by the intermediary payment service system and in the data store maintained by the intermediary payment service system, an association between the account information of the recipient of the payment and the recipient-anonymizing token;
- providing, by the intermediary payment service system, for display of the recipient-anonymizing token within the first payment application executing on the device of the recipient, wherein the recipient-anonymizing token is presented in a format that anonymously embeds the recipient identification information and the account information of the recipient such that the recipient identification information and the account information of the recipient remain unknown to the sender of the payment; and
- based at least in part on receiving, by the intermediary payment service system and from the device of the sender of the payment, an indication of an intent to transfer the payment via a second payment application executing on the device of the sender of the payment:
  - comparing, by the intermediary payment service system, a received token associated with the indication of the intent to transfer the payment to the recipient-anonymizing token stored in the data store maintained by the intermediary payment service system, wherein the received token is generated through interaction with the recipient-anonymizing token;
  - responsive to a determination of a correspondence between the received token and the recipient-anonymizing token, identifying, by the intermediary payment service system, a recipient account associated with the recipient based on the previously stored association between the account information of the recipient and the recipient-anonymizing token in the data store of the intermediary payment service system; and
  - facilitating, by the intermediary payment service system, the transfer of the payment corresponding to a transaction amount to the recipient account.

16. The intermediary payment service system of claim 15, wherein the instructions are further configured to cause the intermediary payment service system perform operations further comprising:
- identifying, by the intermediary payment service system and in the data store maintained by the intermediary payment service system, a sender account associated with the sender, wherein the intermediary payment service system facilitates the transfer of the payment from the identified sender account to the recipient account.

17. The intermediary payment service system of claim 16, wherein the sender account and the recipient account are each any of a bank account, a pre-paid account, or a credit card account.

18. One or more computer-readable non-transitory storage media including instructions that, when executed by one or more processors of an intermediary payment service system, are configured to cause the intermediary payment service system to perform operations comprising:

receiving, by the intermediary payment service system for anonymously transferring money through an exchange of information between a device of a recipient of a payment and a device of a sender of the payment and from a first payment application associated with the intermediary payment service system and executing on the device of the recipient of the payment, a request from the recipient of the payment to generate a recipient-anonymizing token, the request from the recipient of the payment including recipient identification information and transaction information associated with a transaction;

identifying, by the intermediary payment service system and in a data store maintained by the intermediary payment service system, account information of the recipient using the recipient identification information received from the device of the recipient of the payment;

generating, by the intermediary payment service system and based on the identified account information and the transaction information received from the device of the recipient of the payment, the recipient-anonymizing token corresponding to the recipient of the payment, wherein generating the recipient-anonymizing token through the intermediary payment service system necessitates the sender of the payment to communicate through the intermediary payment service system for the transfer of the payment to the recipient such that sender identification information is concealed from the recipient of the payment and recipient identification information is concealed from the sender of the payment and the sender and recipient remain anonymous during the transfer of the payment;

storing, by the intermediary payment service system and in the data store maintained by the intermediary payment service system, an association between the account information of the recipient of the payment and the recipient-anonymizing token;

providing, by the intermediary payment service system, for display of the recipient-anonymizing token within the first payment application executing on the device of the recipient, wherein the recipient-anonymizing token is presented in a format that anonymously embeds the recipient identification information and the account information of the recipient such that the recipient identification information and the account information of the recipient remain unknown to the sender of the payment; and based at least in part on receiving, by the intermediary payment service system and from the device of the sender of the payment, an indication of an intent to transfer the payment via a second payment application executing on the device of the sender of the payment:

comparing, by the intermediary payment service system, a received token associated with the indication of the intent to transfer the payment to the recipient-anonymizing token stored in the data store maintained by the intermediary payment service system, wherein the received token is generated through interaction with the recipient-anonymizing token;

responsive to a determination of a correspondence between the received token and the recipient-anonymizing token, identifying, by the intermediary payment service system, a recipient account associated with the recipient based on the previously stored association between the account information of the recipient and the recipient-anonymizing token in the data store of the intermediary payment service system; and facilitating, by the intermediary payment service system, the transfer of the payment corresponding to a transaction amount to the recipient account.

19. The one or more computer-readable non-transitory storage claim 18, wherein the instructions are further configured to cause the intermediary payment service system to perform operations further comprising:

identifying, by the intermediary payment service system and in the data store maintained by the intermediary payment service system, a sender account associated with the sender, wherein the intermediary payment service system facilitates the transfer of the payment from the identified sender account to the recipient account.

20. The one or more computer-readable non-transitory storage media of claim 19, wherein the sender account and the recipient account are each any of a bank account, a pre-paid account, or a credit card account.

* * * * *